United States Patent
Taniguchi et al.

(10) Patent No.: US 6,322,703 B1
(45) Date of Patent: Nov. 27, 2001

(54) METHOD FOR PURIFYING AQUEOUS SUSPENSION

(75) Inventors: Tohru Taniguchi; Nobuhiko Suga; Takehiko Otoyo, all of Fuji (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/496,590

(22) Filed: Feb. 2, 2000

(30) Foreign Application Priority Data

Apr. 20, 1999 (JP) .................................................. 11-112577
Aug. 6, 1999 (JP) .................................................. 11-223552

(51) Int. Cl.⁷ ............................ B01D 65/02; B01D 63/02
(52) U.S. Cl. ...................... 210/636; 210/651; 210/500.23
(58) Field of Search ............................... 210/85, 87, 96.1, 210/106, 108, 321.69, 500.23, 636, 650, 739, 745, 791, 651

(56) References Cited

U.S. PATENT DOCUMENTS

| | | | |
|---|---|---|---|
| 4,921,610 | * 5/1990 | Ford et al. | 210/636 |
| 5,151,191 | * 9/1992 | Sunaoka et al. | 210/500.23 |
| 5,403,379 | * 4/1995 | Smith et al. | 210/321.69 |
| 5,725,949 | 3/1998 | Pasquali et al. | 428/364 |

FOREIGN PATENT DOCUMENTS

| | | |
|---|---|---|
| 57194007A | 11/1982 | (JP) . |
| 6019002A | 2/1985 | (JP) . |
| 6245709A | 2/1987 | (JP) . |
| 62-155858 A | 7/1987 | (JP) . |
| 62266106A | 11/1987 | (JP) . |
| 6422308A | 1/1989 | (JP) . |
| 228721U | 2/1990 | (JP) . |
| 440222A | 2/1992 | (JP) . |
| 6200407A | 7/1994 | (JP) . |
| 6212520A | 8/1994 | (JP) . |
| 7171354A | 7/1995 | (JP) . |
| 8246283A | 9/1996 | (JP) . |
| 921024A | 1/1997 | (JP) . |
| 11090187A | 4/1999 | (JP) . |

* cited by examiner

Primary Examiner—Joseph W. Drodge
(74) Attorney, Agent, or Firm—Birch, Stewart, Kolasch & Birch, LLP

(57) ABSTRACT

A method and apparatus for purifying an aqueous suspension comprising feeding an aqueous suspension containing fine particles comprising an inorganic component from the outer surface of a wavy hollow fiber membrane having an outer diameter of from 0.5 to 3.1 mm to filter, followed by physical wash of the hollow fiber membrane. The purifying method can reduce the damage of the membrane outer surface during the physical wash step, prevent open pores on the surface from covering and achieve stable filtration. The hollow fiber membrane bundle can be produced by having a pulsation flow contacted with the hollow fiber material being extruded from the double spinning nozzle under specific conditions and cooling and solidifying or coagulating it while shaking.

15 Claims, 5 Drawing Sheets

METHOD FOR PURIFYING AQUEOUS SUSPENSION

BACKGROUND OF THE INVENTION

1. Field of the Invention

The present invention relates to a method for purifying an aqueous suspension with a module comprising wavy hollow fiber membranes. Particularly, the present invention relates to a method for purifying an aqueous suspension, for example, tap water such as river water, lake water, marsh water and groundwater; water for industrial use: waste water; secondary treatment waste water; industrial sewage; domestic sewage; human waste; sea water and the like with the module.

Further, the present invention is also directed to a bundle of wavy hollow fiber membranes, a process for producing the same, and a hollow fiber membrane module comprising the same.

2. Related Art

Heretofore, various methods for purifying aqueous suspensions such as tap water, water for industrial use, waste water, industrial sewage, domestic sewage, human waste, sea water and the like with a hollow fiber membrane have been known. In particular, a purifying method according to so-called external pressure filtration, in which raw water permeates in the direction from the outer to inner surface of a hollow fiber membrane, can secure a larger membrane area contributing to filtration per unit volume when compared to so-called internal pressure filtration, in which raw water permeates in the direction from the inner to outer surface of a hollow fiber membrane. Therefore external pressure filtration is advantageously used in the field wherein minimization of water production cost is required, for example, a water-treatment field such as turbidity removal for water-works.

In the above method for purifying aqueous suspensions with hollow fiber membranes, suspended or organic materials having a size bigger than the pore diameter of the membranes, are hindered on the membrane surface to cause a so-called concentration polarization or form a cake layer. Moreover, the organic materials in aqueous suspension clog the pores of membranes or adhere to the inner network structure of membranes. As a result, the filtration flux upon filtering the raw water is decreased to about one tenth of that upon filtering pure water. Accordingly, there have been also known purifying methods in which physical wash of membranes is regularly practiced after the filtration in order to achieve a more stable filtration flux.

Specifically, it has been known to carry out, after a certain-term filtration, backward wash comprising feeding a part of filtrate in the reverse direction to the filtration, i.e., in the direction from the filtrate side to the raw water side (hereinafter simply referred to as back wash), air-scrubbing comprising supplying compressed gases and/or compressed air and raw water in the direction from the lower to upper part of the hollow fiber membrane module filled with water to shake fibers and discharge suspended solids accumulating among the hollow fiber membranes from the system, and the like. For example, Japanese Patent Application Laid-Open No. 60-19002 discloses a method in which a bubble generation nozzle is arranged on the side of or down the hollow fiber membranes in the hollow fiber membrane storage container, and a gas is injected therefrom together with back wash.

On the other hand, as a membrane which can be used for the above-mentioned purifying method, a reverse osmosis membrane, an ultrafiltration membrane, a microfiltration membrane, a gas separation membrane, a nanofilter, and a deairing membrane have been known. These membranes are not used alone but used in plural, i.e., in the form of a hollow fiber membrane module. The membrane module is prepared by mounting a plurality of the membranes in a module case, sealing at least one edge thereof with a thermosetting resin such as an epoxy resin, and cutting the bonded and fixed portion to open a hollow portion. Such a module is used in various fluid treatment fields, for instance, a reverse osmosis membrane module is used for desalination of sea water or brine, production of primary pure water of ultra-pure water, and concentration of fruit juice or milk; an ultrafiltration membrane module for collection of electrodeposition paints, production of pyrogen-free water, treatment of waste water, concentration of enzymes, final filtration of ultra-pure water, and turbidity removal from tap water or waste water; a microfiltration membrane module for turbidity removal from tap water or waste water, treatment of concentrated water, germ removal and purification of fermentation liquid, and fine particle removal from chemicals; a gas separation membrane module for steam removal, condensation of hydrogen, condensation or enrichment of oxygen, condensation or enrichment of nitrogen, and condensation of carbon dioxide; a nanofilter module for removal of agricultural chemicals or halogenated organic compounds; and a deairing membrane module for deairing of water and aqueous solution. The hollow fiber membranes per se have also been studied. For example, Japanese Patent Application Laid-Open No.64-22308 discloses the art using an external pressure filtration type hollow fiber membrane module wherein hollow fibers having wavy or spiral curls at least in a part thereof are mounted instead of the conventional straight hollow fiber membrane in order to prevent such a mutual clinging of the hollow fibers that hinders raw water from flowing toward the center of the module and to use almost all the hollow fibers mounted in the module for effective filtration.

SUMMARY OF THE INVENTION

We, the present inventors, have made studies on a purifying method enabling a stable filtration.

In particular, we have made studies focusing on the fact that the hollow fiber membrane surface is considerably damaged when the aqueous suspension comprising fine particles containing an inorganic component is purified according to an external pressure filtration method taking a step of physical wash such as back wash and air-scrubbing.

As a result, we have found that when an inorganic component is contained in the suspended solid accumulating among hollow fiber membranes, the outer surfaces of the membranes rub against each other through the suspended solids at the physical wash step and pores on the surface of the membranes are covered with the result that the stability of the filtration operation is deteriorated. Further, we have found that the continuation of such a phenomenon may result in the breakage of the membranes.

As the result of our extensive and intensive studies, we successfully provided, by using a bundle of hollow fiber membranes having specific waves, diameter and further bulkiness, a purifying method enabling a stable filtration, in which the damage of membrane surfaces caused by an inorganic component at the physical wash step, is unexpectedly decreased.

Moreover, in the production of a hollow fiber membrane comprising extruding membrane production raw liquid followed by cooling and then solidification or coagulation, we have also succeeded in efficiently producing a bundle having specific waves, diameter and further bulkiness as described above by contacting a pulsation flow with hollow fiber materials under specific conditions to vibrate and cooling and solidifying or coagulating the hollow fiber materials while vibrating.

Namely, it is an object of the present invention to provide a purifying method enabling stable filtration, in which, during the physical wash step following filtration of aqueous suspension, the external surfaces of hollow fiber membranes is prevented from rubbing against each other through suspended solids in the aqueous suspension containing an inorganic component, and the covering of open pores on the surface of hollow fiber membranes is hindered. It is also an object of the present invention to provide a bundle of the hollow fiber membranes which is used for the purifying method, a process for producing the bundle, and a module mounting the bundle.

It is another object of the present invention to provide a purifying method enabling a stable filtration, in which the efficiency of the physical wash to discharge suspended solids accumulating among hollow fiber membranes is improved without damaging the surface of the hollow fiber membranes. It is also another object of the present invention to provide a bundle which can be used for the purifying method, a method for producing the membrane bundle, and a module mounting the bundle.

Insufficient physical wash may cause accumulation of suspended solids in the hollow fiber membrane bundle so that the membranes cling to each other in the shape of a rod. In such a case, raw water cannot be supplied into the bundle with the result that the amount of the filtrate to be recovered is seriously decreased. Additionally, if physical wash is conducted in the state that the hollow fiber membranes are clinging to each other in a rod shape, the hollow fiber membranes may be broken by an excessive external force toward the horizontal direction. The present invention also solves such problems.

It is another object of the present invention to provide a bundle capable of decreasing defects caused upon bonding and fixing a bundle to a module case even if a bonding agent to be employed has a high initial viscosity before hardening or the bundle is bonded and fixed to a large-scale module case with a large diameter, and to provide a process for producing the bundle.

The above-mentioned objects of the present invention can be achieved by the following.

1) A method for purifying aqueous suspension comprising feeding aqueous suspension containing a fine particle comprising an inorganic component from the outer surface of a wavy hollow fiber membrane having an outer diameter of from 0.5 to 3.1 mm to filter, followed by physical wash of the hollow fiber membrane.

2) A hollow fiber membrane bundle which is prepared by collecting a plurality of wavy hollow fiber membranes so as to orient in the same direction with a bulkiness of from 1.45 to 2.00, wherein the membrane has an inner diameter of from 0.3 to 1.7 mm, an outer diameter of from 0.5 to 3.1 mm, a membrane thickness of from 0.1 to 0.7 mm, and a flatness of from 0.8 to 1.0.

3) A method for producing a hollow fiber membrane bundle comprising the steps of:
  i) extruding membrane production raw liquid in the form of a hollow fiber through a co-axial tube-in-orifice spinning nozzle to obtain a hollow fiber material,
  ii) cooling and solidifying or coagulating the hollow fiber material to obtain a hollow fiber membrane, and
  iii) collecting a plurality of the thus-obtained hollow fiber membranes so as to orient in the same direction;
wherein a pulsation flow is contacted with the hollow fiber material before or during the cooling and solidifying step or the coagulating step.

4) A hollow fiber membrane module, wherein a plurality of wavy hollow fiber membranes each having an inner diameter of 0.3 to 1.7 mm, an outer diameter of 0.5 to 3.1 mm, a membrane thickness of 0.1 to 0.7 mm and a flatness of 0.8 to 1.0 is collected so as to orient in the same direction and mounted with a packing ratio of from 35 to 55%.

DETAILED DESCRIPTION OF THE INVENTION

Hereinafter, the present invention is illustrated in detail.
<PURIFYING METHOD>

The purifying method of the present invention is a method for purifying aqueous suspension comprising feeding aqueous suspension containing a fine particle comprising an inorganic component from the outer surface of a wavy hollow fiber membrane having an outer diameter of from 0.5 to 3.1 mm to filter, followed by physical wash of the hollow fiber membrane.

The filtration type can be either a dead-end type filtration wherein the whole quantity of raw water supplied is recovered as filtrate, or a cross flow type filtration wherein a part of raw water supplied is recovered as concentrated water outside the membrane module system. Also, it may be either a pressurizing filtration type wherein raw water is pressurized from the outer surface side of the membrane by using a pump or the like to obtain filtrate, or a decompressing filtration type wherein a membrane module is submerged in a raw water tank or a raw water pit and the inner surface side of membrane is decompressed to obtain filtrate. The pressurizing filtration type is preferred because a higher filtration flux can be obtained.

Figure 1:
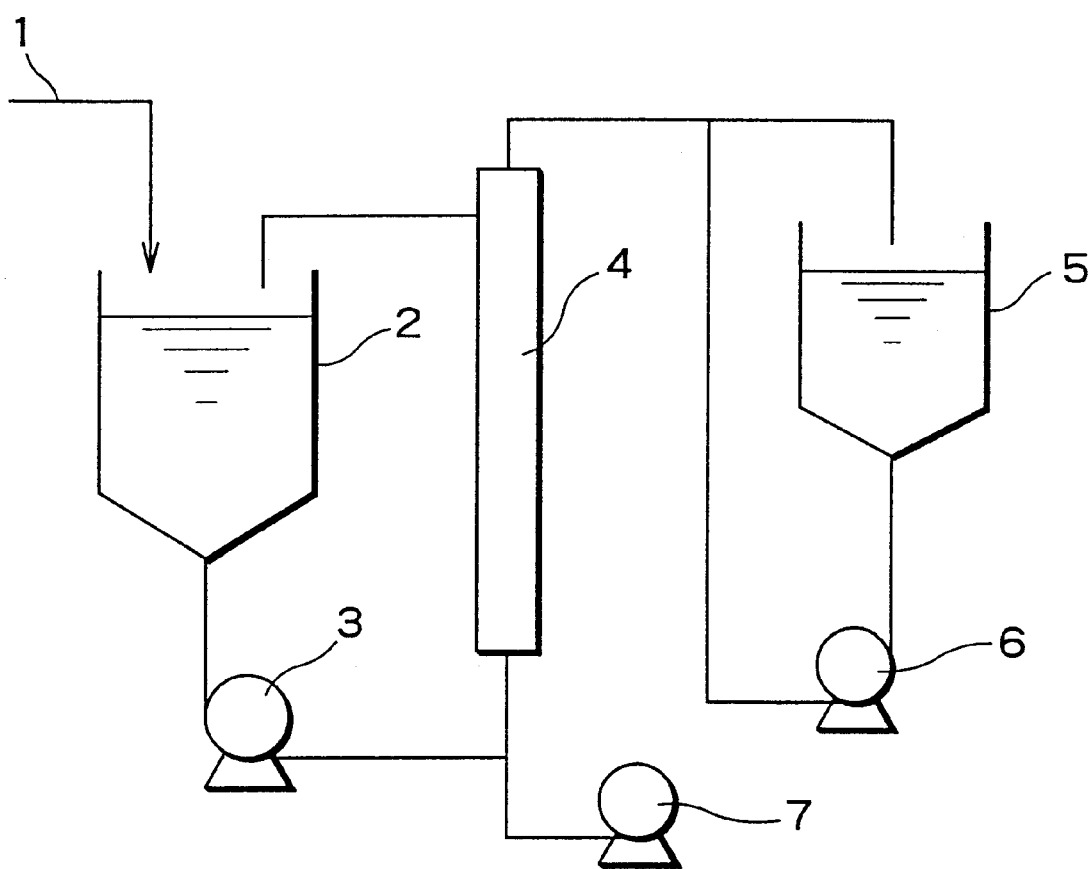
FIG. 1 is a flow chart of an example of the purifying method of the present invention.

An example of filtration is shown in FIG. 1. In FIG. 1, raw water (aqueous suspension) (1) is fed under pressure into a hollow fiber membrane module (4) through a circulation tank (2) with a raw water feed pump (3). The fine particles in raw water are trapped on the outer surface of hollow fiber membranes and the resultant filtrate is introduced into a filtrate tank (5) and stored therein.

The raw water is fed from the outer surface side of a wavy hollow fiber membrane having an outer diameter of from 0.5 to 3.1 mm. Although the outer diameter of the hollow fiber membrane can be changed depending on the effective length of a membrane module, the expected quantity of filtrate, or the like, is required to be within the range of from 0.5 to 3.1 mm in view of the pressure loss of filtrate in the hollow part of the membrane or the like. The outer diameter is preferably within the range of from 0.7 to 2.5 mm, more preferably within the range of from 1.0 to 2.5 mm.

In the present invention, wavy hollow fiber membranes are collected in the longitudinal direction so as to be bulky and mounted in a module. Therefore, the hollow fiber membranes contact almost at points and hardly rub against each other through suspended solids so that open pores on the membrane surface are not easily covered. As a result, a stable filtration operation is achieved. For the same reasons, suspended solids hardly accumulate in a hollow fiber membrane bundle, and even if the solids accumulate, they are easy to discharge by taking a step of physical wash such as back wash, air-scrubbing and flushing so that a stable filtration operation over a long period can be achieved.

The raw water is not particularly limited as far as it Is an aqueous suspension containing fine particles comprising an inorganic component. It includes river water, lake water, marsh water, ground water, reservoir water, secondary treatment waste water, industrial sewage, waste water and the like. The fine particles comprising an inorganic component mean a suspended solid element in aqueous suspension, and indicate metals such as iron, manganese, aluminum and silicon; oxides thereof; oxide compounds thereof; and/or their condensation particle with organic compounds such as humic acid and fulvic acid. The fine particle includes a particle having a diameter of from 0.1 to 500 $\mu$m. When raw water to be fed into a module contains a big particle having a diameter more than 500 $\mu$m like river water, pre-treatment like screen mesh is generally conducted to prevent the big particle from being fed into a module. The particle diameter is a value measured by using a particle size distribution measuring apparatus of laser diffraction/scattered type, LA-910 (trade name) manufactured and sold by Horiba, Ltd.

The purifying method of the present invention is effective especially in the situation where a suspended solid accumulating on the surface of membranes during the filtration has a large diameter and the accumulation quantity of the solids is large. This is because, in such a situation, the membrane surface is most seriously damaged by the solids upon physical wash.

The amount of water to be filtered and the filtration time are appropriately adjusted according to the turbidity of raw water (aqueous suspension). As the turbidity of raw water becomes higher, it is necessary to reduce the amount of water to be filtered or shorten the time until the physical wash. Further, as the amount of raw water becomes larger, it is necessary to shorten the time until the physical wash. In Particular, for the purpose of preventing the suspended solids accumulating among the hollow fiber membranes from hardening and adhering to each other, it is preferred to select a filtration time so as for the amount of the suspended solids accumulating, which is defined by the following formula, to be in the range of from 0.0005 to 10, moreover in the range of from 0.01 to 10. The amount of suspended solids accumulating is a parameter for the amount of suspended solids accumulating on the unit membrane surface during a filtration step and is defined by the following formula:

Amount of suspended solids accumulating=(Raw water turbidity [degree])×(Total amount of filtrate permeating membrane in filtration time [m$^3$])/(Membrane surface area [m$^2$])

The turbidity of raw water in the above formula means an average turbidity among days, and can be obtained by measuring the turbidity for plural days according to JIS K0101 9.2 and averaging the obtained values.

In the purifying method of the present invention, the filtration as described above is followed by physical wash such as back wash, air-scrubbing and flushing.

The back wash is an operation comprising feeding a part of filtrate and/or a compressed gas from the filtrate side of a hollow fiber membrane (the inner surface side in case of the external pressure type filtration) to the raw water side (the outer surface side In case of the external pressure type filtration) to generate a flow of liquid and/or gas in the reverse direction to the ordinary filtration flow. For example, in FIG. 1, washing (back wash) is performed by feeding the filtrate in a filtrate tank (5) into a hollow fiber membrane module (4) with a back wash pump (6).

Each time necessary for a filtration step and a back wash step is appropriately selected according to the quality of raw water, the expected amount of filtrate, or the like. It is preferred that the time of the back wash step is from $\frac{1}{10000}$ to $\frac{1}{5}$ of that of the filtration step. When the time of the back wash step is shorter than $\frac{1}{10000}$ of that of the filtration step, the effect of the back wash can be deteriorated. When the time of the back wash step is longer than $\frac{1}{5}$ of that of the filtration step, a filtration time per unit time becomes short. As a result, the recovery ratio of filtrate may be decreased when filtrate is used for back wash.

In view of the balance of a recovery ratio of filtrate and membrane recoverability by physical wash, water and/or compressed gas for back wash flows preferably in a flow amount [m$^3$/Hr] of from 0.5 to 5 times, particularly preferably in a flow amount [m$^3$/Hr] of from 1 to 3 times, as large as the flow amount [m$^3$/Hr] of filtrate during the filtration step.

The air-scrubbing step is an operation comprising feeding raw water containing compressed gas such as compressed air and/or only compressed gas from the downside of a hollow fiber membrane module between the filtration steps to discharge the suspended solids accumulating among the hollow fiber membranes from the module. For example, in FIG. 1, air-scrubbing is performed by feeding compressed air generated in a compressor (7) into a raw water inlet of a hollow fiber membrane module (4). When the air-scrubbing step is carried out alone between the filtration steps using a conventional hollow fiber membrane module, the membrane surface may be damaged and the open pores on the surface may be covered if the amount of suspended solid accumulating per unit membrane area is large at the time of conducting air-scrubbing. According to the present invention, however, the treated water having high quality can be stably obtained at a high flow velocity of the membrane filtration even if severe air-scrubbing as described above is performed alone.

Respective times necessary for a filtration step and an air-scrubbing step are appropriately selected according to the quality of raw water, the expected amount of filtrate, or the like. It is preferred that the time of the air-scrubbing step is from $\frac{1}{10000}$ to $\frac{1}{5}$ of that of the filtration step. When the time of the air-scrubbing step is shorter than $\frac{1}{10000}$ of that of the filtration step, the effect of air-scrubbing can deteriorate. When the time of the air-scrubbing is longer than $\frac{1}{5}$ of that of the filtration step, the proportion of the air-scrubbing step time to the total operation time becomes large. As a result, the amount of filtrate recovered per unit time is decreased.

The flow amount [Nm$^3$/Hr] of gas fed in the normal state during the air-scrubbing step is preferably from 0.5 to 20 times, more preferably from 1 to 10 times, as large as the flow amount [m$^3$/Hr] of filtrate during the filtration step. The effect of air-scrubbing may be deteriorated when the flow amount is under the lower limit, and the hollow fiber membranes may be dried when the flow amount is over the upper limit.

The flushing step is an operation comprising widely opening a valve on the condensed water side and/or an air exhausting valve and feeding raw water in an amount larger than that in the filtration step to discharge the suspended solids accumulating among the hollow fiber membranes from the module. In this step, the valve on the filtrate side may be closed or throttled. Respective times necessary for a filtration step and a flushing step are appropriately selected according to the quality of raw water, the expected amount of filtrate or the like. It is preferred that the time of the flushing step is from 1/10000 to 1/5 of that of the filtration step. When the time of the flushing step is shorter than 1/10000 of that of the filtration step, the effect of flushing may deteriorate. When the time of the flushing step is longer than 1/5 of that of the filtration step, the proportion of the flushing step time to the total operation time becomes large. As a result, the amount of filtrate recovered per unit time is decreased.

In view of the balance of a recovery ratio of filtrate and membrane recoverability by physical wash, a flushing amount [m$^3$/Hr] of water during the flushing step is preferably from 1.1 to 8.0 times, more preferably from 1.5 to 5.0 times, as large as the flow amount [m$^3$/Hr] of filtrate during the filtration step.

The above-mentioned physical wash may be performed alone or in combination. Air-scrubbing simultaneous with back wash enables a stabler and longer-term filtration operation because it releases the compaction of suspended solids accumulating on the membrane surface and makes the solids float to discharge by air-scrubbing. It is also acceptable to perform back wash alone prior to air-scrubbing or air-scrubbing simultaneous with back wash. In this case, the release of the compaction of suspended solids accumulating on the membrane surface is advantageously accelerated. It is also acceptable to perform back wash alone after air-scrubbing or air-scrubbing simultaneous with back wash. In this case, the discharge of suspended solids in a membrane module is advantageously accelerated. Further, the physical wash method, in which flushing is performed after back wash and air-scrubbing are simultaneously performed, can be one of the effective physical wash methods because the recovery ratio of filtrate is improved by subjecting a part of suspended solids discharged by back wash and air-scrubbing to flushing.

Figure 2:
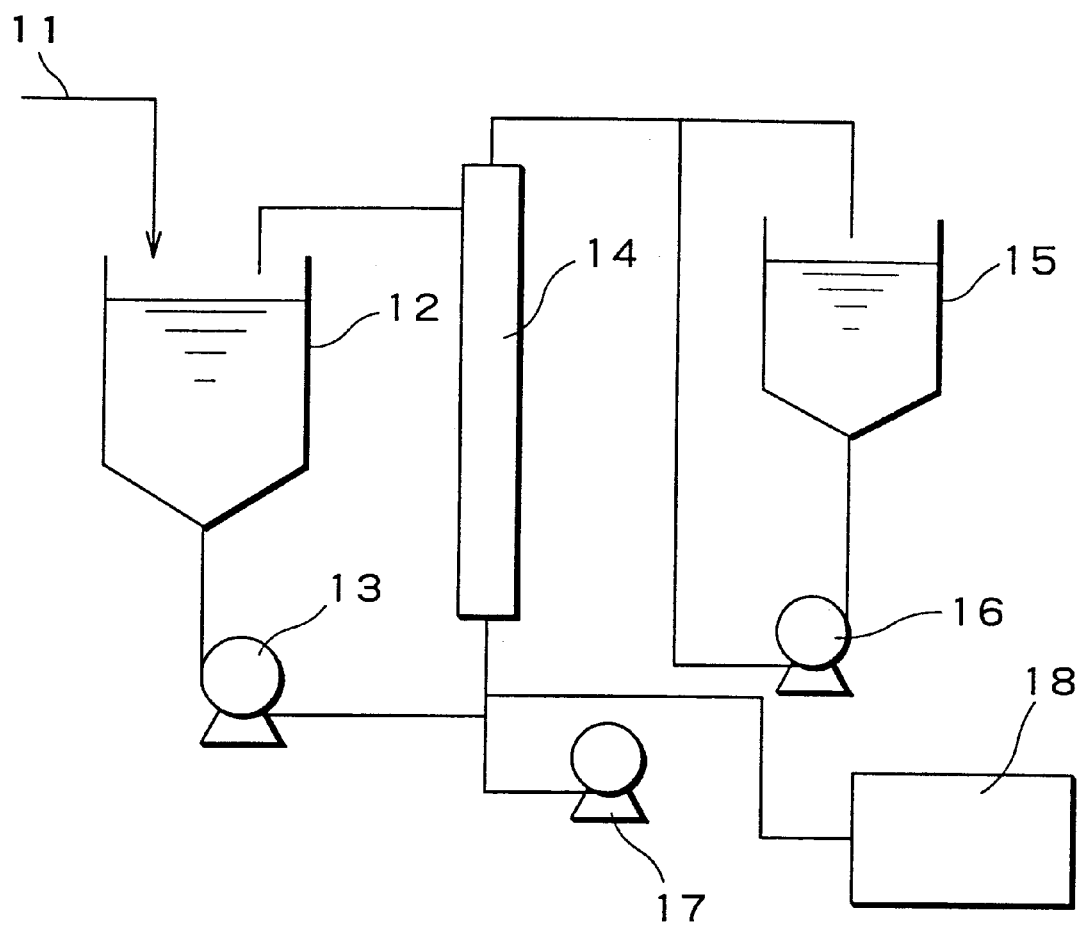
FIG. 2 is a flow chart of the other example of the purifying method of the present invention in which an ozone gas can be added.

The purifying method of the present invention can employ a step of dosing ozone or the like in addition to the above-mentioned filtration step and physical wash step. One example of such a case is shown in FIG. 2. As shown in FIG. 2, raw water (11) is introduced into a circulation tank (12), fed into a hollow fiber membrane module (14) under pressure by using a raw water supplying pump (13), filtered in the module, and then stored in a filtrate tank (15). At this time, the raw water being fed into the module (14) under pressure is mixed with ozone gas generated by an ozone generator (18). The concentration of ozone water is controlled to be a certain concentration, for example 0.3 mg/l, on the filtrate side. At the time of back wash, the filtrate in the filtrate tank (15) is transferred to the module (14) by a back wash pump (16). At this time, air-scrubbing with compressed air generated by a compressor (17) may be performed.

<HOLLOW FIBER MEMBRANE BUNDLE>

The hollow fiber membrane bundle used in the above-mentioned purification method is preferably a bundle which is prepared by collecting a plurality of wavy hollow fiber membranes so as to orient in the same direction with a bulkiness of from 1.45 to 2.00, wherein the membrane has an inner diameter of from 0.3 to 1.7 mm, an outer diameter of from 0.5 to 3.1 mm, a thickness of from 0.1 to 0.7 mm, and a flatness of from 0.8 to 1.0.

The material for a hollow fiber membrane includes polyolefin such as polyethylene, polypropylene, polybutene and the like; fluoro type resin such as a tetrafluoroethylene-perfluoroalkyl vinyl ether copolymer (PFA), a tetrafluoroethylene-hexafluoropropylene copolymer (FEP), a tetrafluoroethylene-hexafluoropropylene-perfluoroalkylvinylether copolymer (EPE), an ethylene-tetrafluoroethylene copolymer (ETFE), polychlorotrifluoroethylene (PCTFE), chlorotrifluoroethylene-ethylene copolymer (ECTFE), polyvinylidene fluoride (PVDF) and the like; super-engineering plastics such as polysulfone, polyether sulfone, polyether ketone, polyether ether ketone, polyphenylene sulfide and the like; cellulose such as cellulose acetate, ethyl cellulose and the like; polyacrylonitrile, polyvinyl alcohol and compositions thereof.

As the hollow fiber membrane, a membrane having a pore diameter in the range of a nanofilter, an ultrafiltration (UF) membrane and a microfiltration (MF) membrane can be used. Among these, the ultrafiltration (UF) membrane and the microfiltration (MF) membrane which basically contribute a high filtrate amount are preferred. In particular, the MF membrane is more preferred. For example, the preferred membrane has an average pore diameter of from 0.001 to 1 $\mu$m, and the more preferred membrane has that of from 0.05 to 1 $\mu$m. Herein, the average pore diameter is measured by an air flow method (ASTM: F316-86). Further, a hollow fiber membrane having a porosity of from 50 to 90% is preferred. Herein, the porosity is calculated from a weight of a hollow fiber membrane saturated with water, a simple volume of a hollow fiber membrane (a volume calculated from the inner diameter, outer diameter and length thereof) and a specific gravity of the polymer used.

The hollow fiber membrane of the present invention is wavy. The wavy hollow fiber membrane means a membrane which meanders when being left without applying any tension.

From the viewpoint of improving the bulkiness of a hollow fiber membrane bundle, it is preferred that the waves having different wavelength and/or wave height exist together.

The hollow fiber membrane bundle has a bulkiness of preferably from 1.45 to 2.00, more preferably from 1.55 to 2.00.

The bulkiness of the hollow fiber membrane mentioned above is defined by the following formula.

$$\text{Bulkiness} = (S1/S2) \tag{I}$$

In the above formula (I), S1 represents cross-section area of a small bundle of six hundred hollow fiber membranes, which are selected randomly from hollow fiber membranes constituting a membrane bundle, under load of 2.9 N (300 gf). S1 can be calculated from the circumferential length of the small bundle measured under load of 2.9 N (300 gf) using a polyethyleneterephthalate (PET) film, which has a thickness of 100 $\mu$m and width of 40 mm, and is equipped with a spring scale at the edge. S2 represents a value which is obtained by multiplying the cross-sectional area of a hollow fiber membrane calculated using the outer diameter thereof by six hundred.

Figure 3:
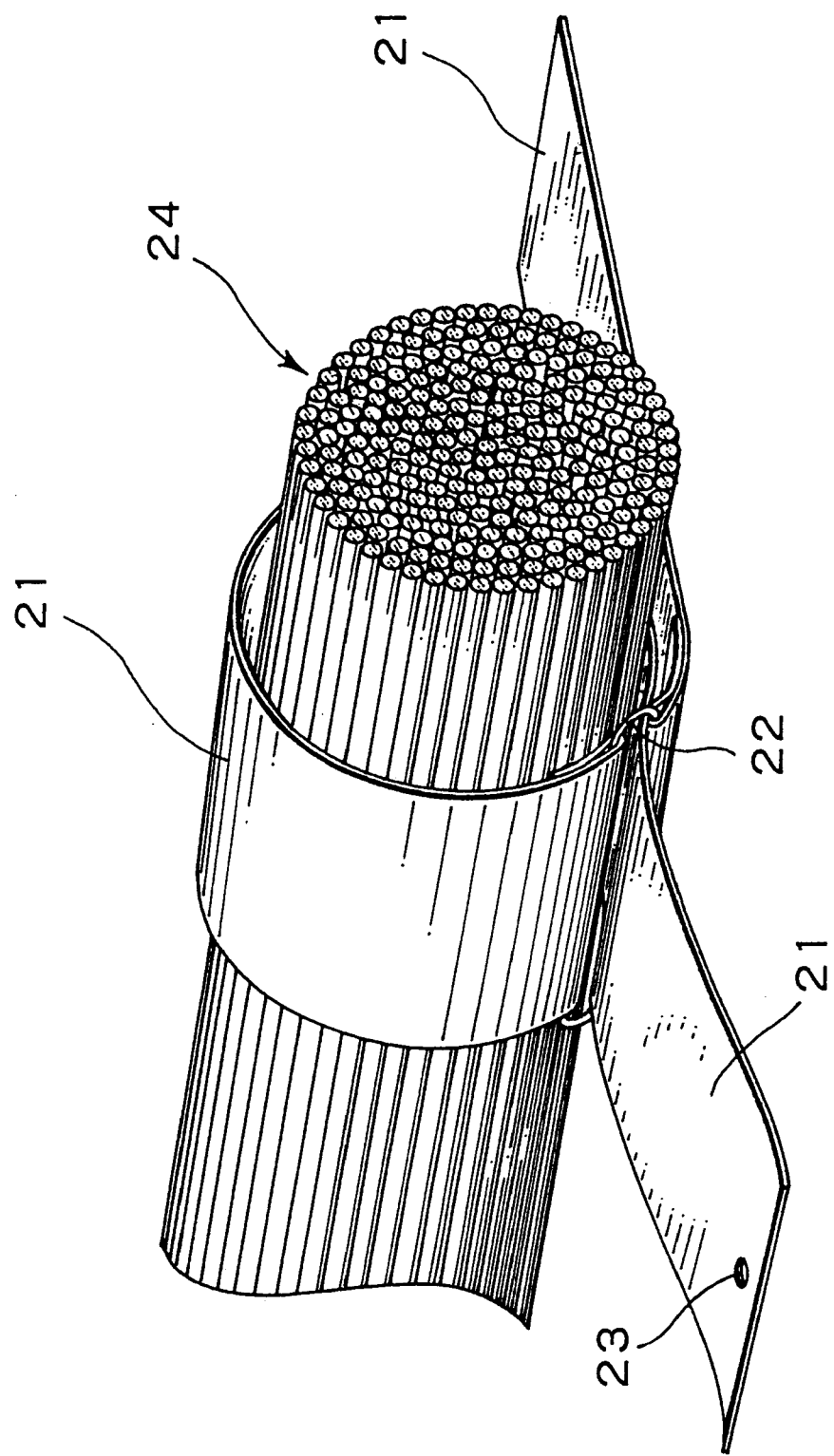
FIG. 3 is a schematic view of an example of a tool used for measuring bulkiness of a hollow fiber membrane bundle of the present invention.

Further, the circumferential length of a hollow fiber membrane bundle could be more easily measured by using a tool for the bulkiness measurement prepared by joining two PET films through a rectangular frame in advance. A specific example of the measuring methods is explained referring to FIG. 3.

i) One of the two PET films (21), which are jointed through a rectangular frame (22), is passed through the frame (22) to make a cylinder.

ii) Into the cylinder, a hollow fiber membrane bundle (24) is installed. After fixing one of the two PET films, 2.9 N (300 gf) weight was applied to the other PET film with a hole (23), which is arranged in advance for holding the hook of a spring scale, through a spring scale to mark the PET film.

iii) The PET film is taken off and the circumferential length is measured from the marking. At this time, it is preferred that the PET film is graduated because the circumferential length is directly measured.

When the bulkiness is less than 1.45, the uniformity of a filling adhesive agent at the time of preparing a module and the efficiency of discharge of suspended solids by physical wash after a module is made can be insufficient. When the bulkiness is more than 2.00, a maximum number of hollow fiber membranes to be installed in a module can decrease so that it can be difficult to obtain a sufficient membrane area per module.

The outer diameter of the hollow fiber membrane is within the range of from 0.5 to 3.1 mm, preferably within the range of from 0.7 to 2.5 mm, more preferably within the range of from 1.0 to 2.5 mm, from the viewpoint of the amount of filtrate to be recovered, the efficiency of compressive creep, the necessary bursting pressure or the like. In addition, the inner diameter of the hollow fiber membrane is preferably within the range of from 0.3 to 1.7 mm. In case of the external pressure filtration, since filtrate flows in the hollow portion of the hollow fiber membranes, the inner diameter of less than 0.3 mm causes the increase of pressure loss of filtrate in the hollow portion so that a filtrate amount to be recovered can be reduced with the decrease of the effective membrane area in a module. On the other hand, when the inner diameter is more than 1.7 mm, it is difficult to obtain a large membrane area per module so that a filtrate amount to be recovered can be decreased as well. The thickness of the hollow fiber membrane is preferably within the range of from 0.1 to 0.7 mm, more preferably within the range of from 0.2 to 0.5 mm, from the viewpoint of the balance of the compressive creep efficiency and necessary bursting pressure, which are exhibited when the inner diameter of the membrane is within the above-mentioned range.

The flatness of the hollow fiber membrane is preferably from 0.8 to 1.0. Herein, the flatness means a ratio of the inner minor axis to the inner major axis, especially the ratio at the curved portion of a wavy membrane, when the cross-section of the hollow fiber membrane is oval. The ratio is defined by the following formula.

$$\text{Flatness} = \text{Minor Axis/Major Axis}$$

The flatness may be calculated either from a value measured only at one point, or from an average of respective values of the minor axis and major axis measured at certain points, for example 5 points.

When the flatness is less than 0.8, the burst strength or the compressive strength can be greatly decreased, and the pressure loss of the expansion and the reduction can be repeated when the filtrate passes through the waved portions of the hollow fiber membrane. As a result, the operation pressure at the time of filtration operation can be increased and the stability of filtration can be defective. The flatness is preferably not less than 0.9, more preferably not less than 0.95, to improve the bursting strength and the compressive strength and suppress the rise of pressure loss.

It is preferred that the hollow fiber membrane bundle of the present invention consists of wavy hollow fiber membranes in order to reduce the contact portion where the hollow fiber membranes in contact each other and to prevent the covering of open pores on the membrane surface caused by scrubbing of the membrane surfaces.

<METHOD FOR PRODUCING HOLLOW FIBER MEMBRANE BUNDLE>

The hollow fiber membrane bundle of the present invention can be preferably obtained by a method for producing a hollow fiber membrane bundle comprising the steps of extruding membrane production raw liquid in the form of a hollow fiber through a co-axial tube-in-orifice spinning nozzle to obtain a hollow fiber material, cooling and solidifying or coagulating the hollow fiber material to obtain a hollow fiber membrane, and collecting a plurality of the thus-obtained hollow fiber membranes so as to orient in the same direction; wherein a pulsation flow is contacted with the hollow fiber material before or during the cooling and solidifying step or the coagulating step.

Figure 4:
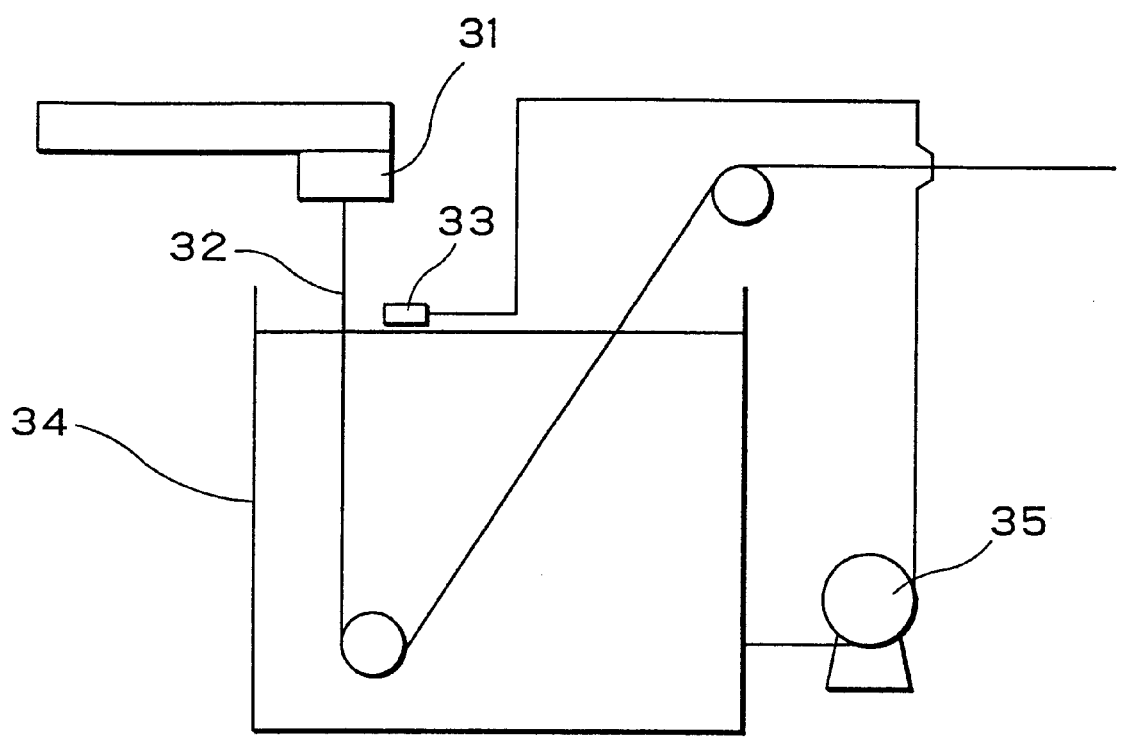
FIG. 4 is a schematic view of an example of the method for producing a hollow fiber membrane of the present invention.

One of the examples of this method is shown in FIG. 4. Hereinafter, the method of the present invention is explained referring to FIG. 4.

One of the features of the present invention is to contribute waves to a membrane by contacting a hollow fiber material (32) extruded from the spinning nozzle (31) to flow down in a half-solidified state with a pulsation flow injected from a pulsation flow exhalation nozzle (33). Namely, by making a pulsation flow contacted with a half-solidified hollow fiber material, the hollow fiber material is vibrated. In a curved state, the material is cooled and solidified or coagulated in a cooling and solidifying bath or a coagulation bath. As a result, waves can be formed easily.

The wavy hollow fiber membrane can be also obtained by other methods than above, for example, heat treatment of the hollow fiber membrane or the like. In case of a hollow fiber membrane having a large diameter, however, the hollow portion of the membrane can be unpreferably crushed or flattened in excess when it is tried to form waves according to the above-mentioned heat treatment. On the contrary, the production method of the present invention employing the above-mentioned pulsation flow can contribute waves without causing any flatness of inner/outer diameters even if the hollow fiber membrane has a large diameter, for example, an outer diameter of even 2.5 mm. In addition, preferred waves having different wavelength and wave height can be easily formed. Further, it is possible to prevent a damage of the membrane surface because solids do not contact with the membrane surface. According to the production method of the present invention employing a pulsation flow, the flatness of the hollow fiber membrane obtained can be from 0.8 to 1.0, in most cases be from 0.9 to 1.0.

The pulsation flow in the present invention means to supply a fluid such as a gas or a liquid at constant intervals. When a gas is used as a fluid, a pulsation flow can be supplied by opening and shutting an electromagnetic valve or the like of a pressure vessel under pressure. When a liquid is used as a fluid, a pulsation flow can be supplied by exhaling the fluid at constant intervals by using a bellows pump, a diaphragm pump, a plunger pump, a gear pump or the like. In this case, as shown in FIG. 4, a process in which the liquid per se for a cooling and solidification bath or a coagulation bath (34) is circulated with a diaphragm pump (35) and used for a pulsation flow is most preferable since it is a simple process not causing any impurities.

The recurrence interval of a pulsation flow (exhalation interval) is properly adjusted according to a winding speed of a hollow fiber membrane in the membrane production. For instance, when the winding speed is within. the range of from 10 to 30 m/min, the recurrence interval is preferably within the range of from 0.05 to 1.5 sec/shot. When the interval is shorter than 0.05 sec/shot, the pulsation flow does not occur with the result that waves are not formed. When the interval is longer than 1.5 sec/shot, the resultant waves have a long wavelength with the result that the bulkiness is insufficient.

The temperature of a pulsation flow is not especially limited. This temperature can be the temperature of a cooling and solidifying bath, for example, within the range of from 20 to 80° C. in the case of the membrane production process by melt extrusion, and a temperature of a coagulating bath, for example, within the range of from −10 to 80° C. in the case of the wet membrane production.

The waves can be formed by contacting a half-solidified hollow fiber material with a pulsation flow to shake, and cooling and solidifying or coagulating the material in the state of shaking. It is supposed that one contact of a pulsation flow with the hollow fiber material forms not merely one wave, but 2 to 10 waves. The half-solidified hollow fiber material meanders by the contact with a pulsation flow and the meandering attenuates gradually. Therefore, the resultant hollow fiber membrane does not have one kind of the wavelengths and/or wave heights, but various kinds of wavelengths and/or wave heights together.

When the pulsation flow contacts the half-solidified material during the cooling and solidifying or coagulating step, that is, in a cooling and solidifying bath or a coagulating bath, the contact position is preferably, for example, from the bath surface to not deeper than 500 mm below the bath surface. When the pulsation flow contacts the half-solidified material before the cooling and solidifying step or the coagulating step, that is, above the bath surface of the cooling and solidifying bath or the coagulating bath, the contact position is preferably, for example, from the bath surface to not higher than 50 mm above the bath surface. When the contact position is far above the cooling and solidifying bath or the coagulating bath, i.e., near the spinning nozzle, only the portion where the pulsation flow contacts is promptly cooled and solidified or coagulated so that it is possible that pores may not be uniformly formed on the circumference of the hollow fiber membrane and, in an extreme case, no pores may be formed at the contact portion or the skin layer may become thick only at the contact portion. On the contrary, when the contact position is deep in the bath, e.g., deeper than 500 mm below the bath surface, the hollow fiber material is cooled and solidified or coagulated before the contact with the pulsation flow, and waves are not formed.

If a guide such as a thread guide is arranged in the cooling and solidifying bath or the coagulating bath so as for the hollow fiber material not to run off by the contact with the pulsation flow at the time when the pulsation flow is contacted with the hollow fiber material, more preferred waves can be formed.

<HOLLOW FIBER MEMBRANE MODULE>

In the purifying method of the present invention, it is preferred to use a hollow fiber membrane module in which a plurality of wavy hollow fiber membranes each having an inner diameter of 0.3 to 1.7 mm, an outer diameter of 0.5 to 3.1 mm, a thickness of 0.1 to 0.7 mm and a flatness of 0.8 to 1.0 is collected so as to orient in the longitudinal direction and mounted with a packing ratio of from 35 to 55%.

The packing ratio means a ratio at which the inner wall sectional area of a module case is packed with hollow fiber membranes based on the outer diameter of the membrane, which can be calculated by the following formula.

Packing ratio (%)=(Sectional area based on outer diameter of hollow fiber membrane×Packing number of hollow fiber membrane per module)×100/(Sectional area based on inner wall of module case)

By installing a hollow fiber membrane bundle having high bulkiness at a packing ratio of from 35 to 55%, the contact of the hollow fiber membranes remains only at points since the bundle therein is bulky. As a result, the hollow fiber membranes hardly rub against each other through suspended solids and open pores on the outer surface of the hollow fiber membrane are not easily covered. For the same reasons, the suspended solids hardly accumulate in the hollow fiber membrane bundle and are easily discharged by physical wash such as back wash, air-scrubbing, flushing or the like, even if accumulate. As a result, a filtration operation can be stably conducted for a long period. Further, since the distribution situation of the hollow fiber membranes in the inner section of the membrane module improves owing to the waves, the defective portion hardly occurs in the bonded and fixed portion of the module even in the case that the pre-hardening initial viscosity of the bonding agent is high or the module is a large-scale module having a large diameter when the hollow fiber bundle is bonded and fixed to a module case.

Although the packing ratio of less than 35% provides excellent efficiency of discharge by wash, the effect of using a hollow fiber membrane module is reduced since a large membrane area per unit volume of the hollow fiber module is not secured. The packing ratio of more than 55% can secure a large membrane area per unit volume of the hollow fiber module, but the hollow fiber membranes aggregate densely in the module so that the suspended solids are hard to discharge in case of the external pressure filtration.

In the hollow fiber membrane module of the present invention, at least one edge of the hollow fiber membrane bundle is fixed with a thermosetting resin like an epoxy resin. The hollow fiber membrane module of the present invention is mounted with hollow fiber membranes with a hollow portion open and has a structure enabling a filtration from the outer to inner surface of the hollow fiber membrane; therefore, it is suitable for an external pressure filtration. The hollow fiber membrane module may be bonded and fixed at both edges or either edge. It is also allowed to seal the hollow portion of hollow fiber membranes at one of the bonded and fixed edges. It is also possible to use a membrane module in which both edges are bonded and fixed, the hollow portions of the hollow fiber membranes are sealed at one edge and an inlet for raw water is opened as described in Japanese Patent Application Laid-Open No. 7-171354.

The hollow fiber membrane module of the present invention includes a cartridge type module which is used after being installed and arranged in a tank with tube sheets or an outline housing beside a directly connected rack type, which is connected to a rack through pipes or the like. The above-mentioned cartridge type module indicates, differing from the common directly connected rack type module, such a module that maintains the shape of a hollow fiber membrane bundle portion with a cylinder provided with holes by punching or the like, a net and the like, and does not take fluid-tight treatments except for the bonded and fixed portion. In this case, the hollow fiber membrane bundle is allowed to be naked except for the bonded and fixed portion if the bundle can maintain its shape by itself.

Since the hollow fiber membrane module of the present invention employs the wavy hollow fiber membranes as described above, the bonded and fixed portion at the edge of the hollow fiber membranes is less defective even in the case of a large-scale module having an outer diameter of from 170 to 350 mm.

The thermosetting resin used to bond and fix one or both edges of the hollow fiber membrane module of the present invention includes an epoxy resin, a urethane resin, a silicone rubber and the like. If necessary, there may make attempts to improve the strength of a resin partition and reduce shrinkage on curing by adding a filler such as carbon black and fluorocarbon to these resins.

The material of the hollow fiber membrane module case includes polyolefins such as polyethylene, polypropylene and polybutene; fluoro resins such as polytetrafluoroethylene (PTFE), PFA, FEP, EPE, ETFE, PCTFE, ECTFE, PVDF and the like; chloro resins such as polyvinyl chloride and polyvinylidene chloride; a polysulfone resin, a polyethersulfone resin, a polyallyl sulfone resin, a polyphenyl ether resin, an acrylonitrile butadiene styrene copolymer resin (ABS resin), an acrylonitrile styrene copolymer resin, a polyphenylene sulfide resin, a polyamide resin, a polycarbonate resin, a polyether ketone resin, a polyether ether ketone resin, compounds thereof, and metals such as aluminum and stainless steels. In addition, compounds of resin and metals, resin reinforced with glass fiber or carbon fiber can be used.

The hollow fiber membrane module of the present invention can be prepared, for example, by bonding and fixing at least one edge of the hollow fiber bundle collected in the longitudinal direction with a thermosetting resin such as an epoxy resin and then cutting a part of the bonded and fixed portion so as to open the hollow portion of the hollow fiber membrane.

A plurality of openings is preferably arranged at one of the edge bonded and fixed portions of the hollow fiber membrane module to supply raw water and/or gas for air-scrubbing more uniformly. The above-mentioned opening preferably has an equivalent diameter of 3 to 100 mm. When the diameter of the opening is less than 3 mm, the opening can be clogged with suspended solids included in the raw water. When the diameter of the opening is more than 100 mm, it is required to reduce the number of hollow fiber membranes installed in the module and/or the number of the openings so that the raw water is hard to be supplied uniformly. The section configuration of the openings is not especially limited, and includes polygons such as a triangle, quadrangle, hexagon and the like in addition to circle and oval. Among them, circle and oval are preferred. Further, the openings can be arranged uniformly or at random at the edge bonded and fixed portions.

Figure 5:
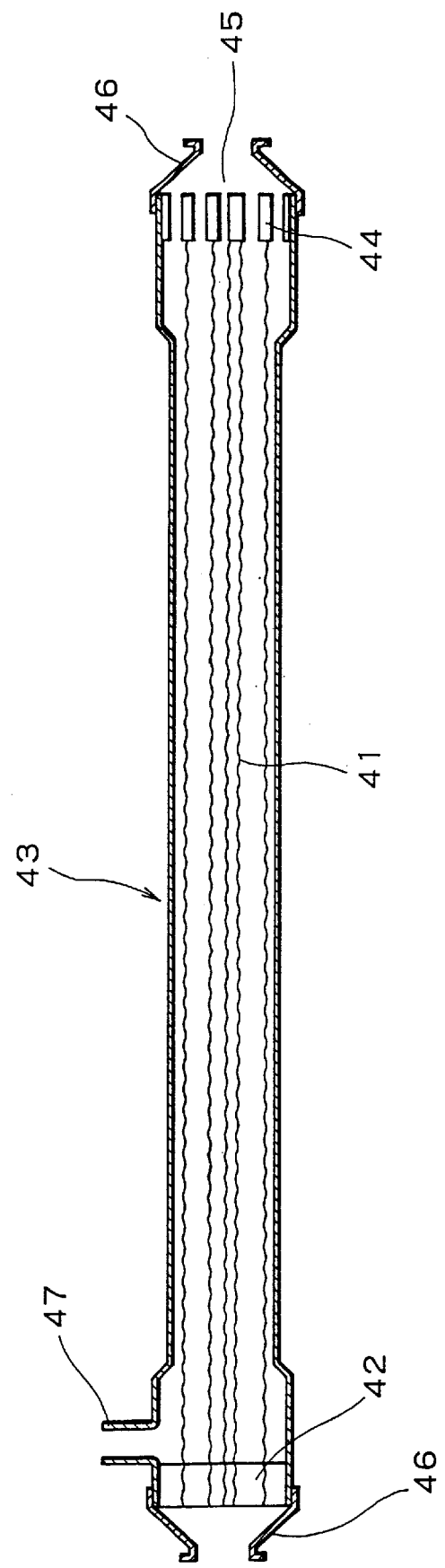
FIG. 5 is a schematic view of an example of the hollow fiber membrane module of the present invention.

One of the examples of the hollow fiber membrane module of the present invention is shown in FIG. 5. In FIG. 5, a hollow fiber membrane module is connected with a pipe of an operation device through a cap (46). The raw water and/or compressed gas to be supplied pass through a raw water inlet (45) and are filtered from the outer to inner surface of the wavy hollow fiber membrane (41).

In this case, the pressure of the raw water pressured by a pump or the like is maintained by a module case (43), and a part of the raw water is recovered as filtrate. The condensed raw water is discharged from the hollow fiber membrane module through a condensed water outlet (47). The hollow fiber membranes with hollow portion open are bonded and fixed fluid-tight to the module case at the bonded portion (42) so as not to mix raw water and filtrate. At a bonded portion (44), the hollow portions of the hollow fiber membranes are sealed and at the same time are equipped with a plurality of openings, and a raw water inlet (45) is arranged.

According to the purifying method of the present invention, it is possible to prevent damage of the membrane surface by fine particles at the time of treating the aqueous suspension containing fine particles comprising an inorganic material with the membrane and to stably perform a filtration over a long term. Accordingly, the present invention is suitable for the field of purifying the aqueous suspension containing an inorganic material, e.g., tap water such as river water, lake water, marsh water and ground water; water for industrial uses; waste water; secondary treatment waste water; industrial sewage; domestic sewage; human waste; sea water and the like. In addition, the hollow fiber membrane module of the present invention has an advantage of less scrubbing and damage to the membranes due to bulky waved hollow fiber membranes having a large diameter. Therefore, it can be suitably used for the purifying method of the present invention. The module also has excellent discharge efficiency of suspended solids. Further, the hollow fiber membrane of the present invention is suitable for a large-scale module which has fewer defects in the bonded portion at the edge of membrane.

Hereinafter, examples of production of the hollow fiber membrane, the hollow fiber membrane module and the aqueous suspension purifying method, which are employed in the present invention, are described. In the Examples and Comparative Examples, turbidity and particle size were measured by the following method.

Flatness of Hollow Fiber Membrane: A curved portion of the wave of the hollow fiber membrane was cut out at five points to measure the minor axis and major axis of the inner diameter thereof using an X-Y microscope [STM-222DH (trade name) manufactured and sold by Olympus Optical Company Limited], and flatness (minor axis/major axis) of each portion was calculated.

Turbidity: Measured according to JIS K 0101 9.2 using a measuring apparatus manufactured and sold by Shimadzu Corporation 50 mm cell, UV-160A].

Particle Size: Measured using a particle size distribution meter [LA-910 (trade name) manufactured and sold by Horiba, Ltd.].

Water Flux Amount of Single Hollow Fiber Membrane: Pure water at 25° C. is permeated from the inner to outer surface side of a porous hollow fiber membrane sample having an effective length of 100 mm to calculate a flux amount per unit time and that per unit pressure (differential pressure per unit membrane).

Wash Recoverability: Evaluated based on a ratio (%) of a pure water flux amount of a module after subjected to evaluation by real liquid such as river water and chemical wash to a pure water flux amount (initial value) of a module before subjected to evaluation by real liquid; or a ratio (%) of a pure water flux amount of a single membrane fiber, which is obtained by dismantling a module after evaluation by real liquid and washing only the membrane with chemicals, to a pure water flux amount (a flux amount of an unused membrane) of a single hollow membrane fiber before preparing a module.

EXAMPLE 1 (PRODUCTION OF HOLLOW FIBER MEMBRANE)

40.0 parts by weight of a powdery PVDF [KF#1000 (trade name) manufactured and sold by Kureha Chemistry Co., Ltd.], 23.0 parts by weight of hydrophobic silica [Aerosil R-972 (trade name) manufactured and sold by Nippon Aerosil Co., Ltd.; average primary particle diameter: 0.016 $\mu$m, specific surface area: 110 m$^2$/g, Mw value (methanol wetability, volume %): 50%], 30.8 parts by weight of di-(ethyl-hexyl)-phthalate (DOP) [CS sizer (trade name) manufactured and sold by Chisso Corporation], and 6.2 parts by weight of di-butylphthalate (DBP) [manufactured and sold by Chisso Corporation] were mixed by a Henschel mixer. The resultant blend was extruded and pelletized by means of a twin-screw extruder.

The thus-obtained pellets were melt extruded into a cooling and solidifying bath at 40° C. (hot water at 40° C.), which was placed 30 cm below the spinning nozzle, from a twin-screw extruder having a barrel temperature of 260° C., a head temperature of 235° C. and a spinning nozzle temperature of 230° C. through a co-axial tube-in-orifice spinning nozzle having a size of inner diameter of outside nozzle/outer diameter of inside nozzle/inner diameter of inside nozzle =1.70 mm$\phi$/0.90 mm$\phi$/0.50 mm$\phi$.

At the time of the extrusion, a pulsation flow exhalation nozzle was arranged at the position of 10 mm above the bath surface, and a cooling and solidifying liquid was contacted with the hollow fiber material flowing down at an exhalation interval of 0.3 sec/shot using a diaphragm pump [NDP-5FST manufactured and sold by Yamada Corporation] to obtain a wavy hollow fiber membrane.

The above-mentioned wavy hollow fiber membrane was wound up through a three-ream roller at a winding speed of 20 m/min. The obtained hollow fiber membrane bundle was treated with dichloromethane under the following conditions to extract DOP and DBP from the hollow fiber membrane.
Extraction Conditions:
  Treatment Temperature: room temperature (25 to 27° C.)
  Volume of dichloromethane relative to simple volume of hollow fiber membrane (calculated from inner diameter, outer diameter and length thereof): 20 fold
  Treatment Period: 5 hours Then, the obtained hollow fiber membrane bundle was soaked in a 50% ethanol solution for 30 minutes and treated with a sodium hydroxide solution having a weight percent concentration of 20% under the following conditions to extract silica from the hollow fiber membrane.
Extraction Conditions:
  Temperature: 60° C.
  Volume of sodium hydroxide solution relative to simple volume of hollow fiber membrane (calculated from inner diameter, outer diameter and length thereof): 20 fold (8 fold equivalent in equivalent ratio relative to hydrophobic silica)
  Treatment Period; 2 hours The above treated hollow fiber membrane bundle was rinsed for an hour with 60° C. hot water having the same volume as the above-mentioned sodium hydroxide solution. The above wash with hot water was repeated a total of ten times to obtain a porous hollow fiber membrane bundle. The thus-obtained hollow fiber membrane had an inner diameter/outer diameter of 0.70 mm$\phi$/1.25 mm$\phi$, a porosity of 70%, an average pore diameter of 0.18 $\mu$m, a pure water flux amount of 2,000 [l/m$^2$·min·100 kPa·25° C.], and flatness as shown in Table 1. The circumferential length and the bulkiness of the hollow fiber membrane bundle were 124.0 mm and 1.66, respectively. In addition, waves with different wavelength and wave height coexisted in the hollow fiber membrane.

EXAMPLE 2 (PRODUCTION OF HOLLOW FIBER MEMBRANE)

A hollow fiber membrane bundle was prepared in substantially the same manner as described in Example 1 except that the pulsation flow was not contacted with the hollow fiber. The thus-obtained hollow fiber membrane had an inner diameter/outer diameter of 0.70 mm$\phi$/1.25 mmm$\phi$, a porosity of 70%, an average pore diameter of 0.18 $\mu$m, a pure water flux amount of 2,000 [l/m$^2$·min·100 kPa·25° C.] and flatness as shown in Table 1. In addition, the circumferential length and the bulkiness of the hollow fiber membrane bundle were 115.0 mm and 1.43, respectively.

EXAMPLE 3 (PRODUCTION OF HOLLOW FIBER MEMBRANE)

The hollow fiber membrane obtained in Example 2 was passed between two gears at the atmosphere temperature of 140° C. to obtain a wavy hollow fiber membrane bundle. The gears used had a curvature minimum radius at the edge of 5 mm and an edge distance of 25 mm. Two of such gears were bitten each other so as to be a biting height and minimum gear distance of 15 mm and 3 mm, respectively. The thus-obtained hollow fiber membrane had an inner diameter/outer diameter of 0.70 mm$\phi$/1.25 mm$\phi$, a porosity of 70% and an average pore diameter of 0.18 $\mu$m. Its pure water flux amount was slightly reduced to 1,950 [l/m$^2$·min·100 kPa·25° C.], which was supposed to be caused by an influence of the flatness of the hollow fiber membrane as shown in Table 1. Further, the circumferential length and bulkiness of the hollow fiber membrane bundle were 118.2 mm and 1.51, respectively. In addition, waves of the hollow fiber membrane had approximately the same wavelength and wave height.

EXAMPLE 4 (PRODUCTION OF HOLLOW FIBER MEMBRANE)

The hollow fiber membrane obtained in Example 2 was passed between two gears at the atmosphere temperature of 140° C. to obtain a wavy hollow fiber membrane bundle. The gears used had a curvature minimum radius at the edge of 7 mm and an edge distance of 30 mm. Two of such gears were bitten each other so as to be a biting height and minimum gear distance of 10 mm and 8 mm, respectively. The thus-obtained hollow fiber membrane had an inner diameter/outer diameter of 0.70 mm$\phi$/1.25 mm$\phi$, a porosity of 70% and an average pore diameter of 0.18 $\mu$m. Its pure water flux amount was 2,000 [l/m$^2$·min·100 kPa·25° C.], and the flatness of the hollow fiber membrane as shown in Table 1. Further, the circumferential length and bulkiness of the hollow fiber membrane bundle were 115.5 mm and 1.44, respectively. In addition, waves of the hollow fiber membrane had approximately the same wavelength and wave height.

EXAMPLE 5 (PRODUCTION OF HOLLOW FIBER MEMBRANE MODULE) 300 of the hollow fiber membranes obtained in Example 1 were bundled.

Then, the hollow portion of one of the edge faces of the thus-obtained bundle was sealed and the bundle was mounted in a cylindrical polysulfone module case having an inner diameter of 36 mm$\phi$ and a length of 1,000 mm. On the sealed edge of the hollow fiber membrane, only a bonding jig was attached fluid-tight to the module case. On the other edge of the hollow fiber membrane, a total of five polypropylene rods, each having an outer diameter of 5 mm$\phi$, were arranged in parallel to the hollow fiber membrane and then a bonding jig was attached fluid-tight to the module case. In this case, the packing ratio was calculated at 36% from the outer diameter of the hollow fiber membrane, the packing number of the hollow fiber membranes and the inner diameter of the module case.

The above-mentioned module case equipped fluid-tight with bonding jigs at both edges was centrifugally molded using a two-liquid type epoxy bonding agent. After the centrifugal molding, the bonding jigs and the polypropylene rods were removed, and the bonded portion at the sealed edge was cut to open the hollow portion of the hollow fibers. As described above, a module comprising a bundle of wavy hollow fiber membranes was obtained.

The thus-obtained module was treated with ethanol to become hydrophilic, and the pure water flux amount was measured after replacement with water.

Then, leakage was checked with 100 kPa compressed air. No leak was observed.

EXAMPLE 6 (PRODUCTION OF HOLLOW FIBER MEMBRANE MODULE)

1,800 of the hollow fiber membranes obtained in Example 1 were bundled.

Then, the hollow portion of one of the edge faces of the thus-obtained bundle was sealed, and the bundle was mounted in a cylindrical polyvinyl chloride module case having an inner diameter of 83 mm$\phi$ and a length of 1,000 mm. On the sealed edge of the hollow fiber membrane, only a bonding jig was attached fluid-tight to the module case. On the other edge of the hollow fiber membrane, a total of five polypropylene rods, each having an outer diameter of 11 mm$\phi$, were arranged in parallel to the hollow fiber membrane and then a bonding jig was attached fluid-tight to the module case. In this case, the packing ratio was calculated at 41% from the outer diameter of the hollow fiber membrane, the packing number of the hollow fiber membranes and the inner diameter of the module case.

The above-mentioned module case equipped fluid-tight with bonding jigs at both edges was centrifugally molded using a two-liquid type epoxy bonding agent. After the centrifugal molding, the bonding jigs and the polypropylene rods were removed, and the bonded portion at the sealed edge was cut to open the hollow portion of the hollow fibers. As described above, a module comprising a bundle of wavy hollow fiber membranes was obtained.

The thus-obtained module was treated with ethanol to become hydrophilic, and the pure water flux amount was measured after replacement with water.

Then, leakage was checked with 100 kPa compressed air. No leak was observed.

EXAMPLE 7 (PRODUCTION OF HOLLOW FIBER MEMBRANE MODULE)

Four bundles each comprising 1,440 of the porous hollow fiber membranes obtained in Example 1 were prepared.

Then, after sealing the hollow portion of one of the edge faces of each bundle, the four bundles were mounted in a cylindrical SUS-304 module case having an inner diameter of 150 mm$\phi$ and a length of 1,500 mm. On the sealed edge of hollow fiber membrane, only a bonding jig was attached fluid-tight to the module case. On the other edge of the hollow fiber membrane, a total of 37 polypropylene rods, each having an outer diameter of 10 mm$\phi$, were arranged in parallel to the hollow fiber membrane and then a bonding jig was attached fluid-tight to the module case. In this case, the packing ratio was calculated at 40% from the outer diameter of the hollow fiber membrane, the packing number of the hollow fiber membranes and the inner diameter of the module case.

The above-mentioned module case equipped with the bonding jigs on both edges was centrifugally molded using a silicone bonding agent [TSE-3337(trade name) manufactured and sold by Toshiba Silicone Co., Ltd.].

After the centrifugal molding, the bonding jigs and the polypropylene rods were removed, and then the bonded portion of the sealed edge was cut to open the hollow portions of the hollow fiber membranes after the silicone bonded portion was sufficiently cured. As a result, a hollow fiber membrane module comprising a bundle of wavy hollow fiber membranes was obtained.

Next, the module was mounted in a pressuring container for a module, and leakage was checked with 100 kPa compressed air after being made hydrophilic with a 50% ethanol aqueous solution and being replaced with water. No leak was observed. At the time, a module weight was also measured in the state that the module was wet.

EXAMPLE 8 (PRODUCTION OF HOLLOW FIBER MEMBRANE MODULE)

A hollow fiber membrane module was prepared in substantially the same manner as described in Example 5 except that the hollow fiber membrane obtained in Example 2 was used. The packing ratio of the thus-obtained module was 36%.

After the pure water flux amount was measured, leakage was checked with 100 kPa compressed air. No leak was observed.

EXAMPLE 9 (PRODUCTION OF HOLLOW FIBER MEMBRANE MODULE)

A hollow fiber membrane module was prepared in substantially the same manner as described in Example 6 except that the hollow fiber membrane obtained in Example 2 was used. The packing ratio of the thus-obtained module was 41%.

After the pure water flux amount was measured, leakage was checked with 100 kPa compressed air. No leak was observed.

EXAMPLE 10 (PRODUCTION OF HOLLOW FIBER MEMBRANE MODULE)

A hollow fiber membrane module was prepared in substantially the same manner as described in Example 7 except that the hollow fiber membrane obtained in Example 2 was used. The packing ratio of the thus-obtained module was 40%.

After the pure water flux amount was measured, leakage was checked with 100 kPa compressed air. No leak was observed. In addition, a module weight was also measured in the state the module was wet.

EXAMPLE 11 (PRODUCTION OF HOLLOW FIBER MEMBRANE MODULE)

A hollow fiber membrane module was prepared in substantially the same manner as described in Example 5 except that the hollow fiber membrane obtained in Example 3 was used. The packing ratio of the thus-obtained module was 36%.

After the pure water flux amount was measured, leakage was checked with 100 kPa compressed air. No leak was observed.

EXAMPLE 12 (PRODUCTION OF HOLLOW FIBER MEMBRANE MODULE)

A hollow fiber membrane module was prepared in substantially the same manner as described in Example 6 except that the hollow fiber membrane obtained in Example 3 was used. The packing ratio of the thus-obtained module was 41%.

After the pure water flux amount was measured, leakage was checked with 100 kPa compressed air. No leak was observed.

EXAMPLE 13 (PRODUCTION OF HOLLOW FIBER MEMBRANE MODULE)

A hollow fiber membrane module was prepared in substantially the same manner as described in Example 5 except that the hollow fiber membrane obtained in Example 4 was used. The packing ratio of the thus-obtained was 36%.

After the pure water flux amount was measured, leakage was checked with 100 kPa compressed air. No leak was observed.

EXAMPLE 14 (PURIFYING METHOD/THIS INVENTION)

Using the hollow fiber membrane module obtained in Example 5, an operation was conducted. As raw water, a model liquid (a mixed solution of bentonite and humic acid [bentonite concentration: 1,000 mg/l, humic acid concentration: 500 mg/l in terms of a total organic carbon amount (TOC)] at the time of production) was used. As shown in FIG. 1, raw water (1) was fed under pressure into a hollow fiber membrane module (4) through a circulation tank (2) by using a raw water feed pump (3). The resultant filtrate was stored in a filtrate tank (5). At the time of back wash, the filtrate in the filtrate tank (5) was fed into the hollow fiber membrane module by using a back wash pump (6).

In addition, air-scrubbing was conducted by supplying compressed air generated in a compressor (7) to a raw water inlet of the hollow fiber membrane module.

The filtration was conducted according to a cross-flow type filtration in which raw water (1) was fed into a hollow fiber membrane module (4) at a constant flow of 1.8 [l/min·module·25° C.] so as to be a ratio of a membrane filtration flow to a water circulation flow of 1/1, and conducted according to an external pressure filtration with a constant filtration flow, i.e., a filtrate amount of 0.9 [l/min·module·25° C.].

The operation was performed by repeating a 10 minute filtration followed by back wash with filtrate at a flow of 1.5 [l/min·module·25° C.] for 20 seconds and conducting air-scrubbing with compressed air at a flow of 1.5 [l/min·module·25° C.] for one minute every one hour. The turbidity of raw water was 770 degrees.

The total amount of the filtrate permeating the membrane during the filtration step was 9 liters. The amount of suspended solids accumulating was 5.87.

The turbidity and fine particle mean diameter of the model liquid measured just after the filtration operation were 1,000 degrees and 0.9 to 30 μm (medium value: 9 μm), respectively. After the above-mentioned filtration test was continuously conducted for 20 days, the filtration pressure was 1.2 times the initial value, the average turbidity among days was 770 degrees, and the diameter of fine particle was 0.9 to 30 μm (medium value: 9 μm) as well as the initial value.

After the filtration test was completed, the module was taken out from the device to check leakage. No leak was observed.

Further, the above-mentioned hollow fiber membrane module was washed with a sodium hypochlorite aqueous solution, a sodium hydroxide aqueous solution, an oxalic acid aqueous solution and a nitric acid aqueous solution until the recoverability was saturated. When the pure water flux amount was measured, it was 98% of the initial value.

Subsequently, when the hollow fiber membrane module was dismantled to observe the membrane outer surface of the hollow fiber membrane with a scanning electronic microscope (magnification: 5,000 fold), the damage of the membrane surface was negligible.

EXAMPLE 15 (PURIFYING METHOD/THIS INVENTION)

Using the hollow fiber membrane module obtained in Example 5, an operation was conducted. As raw water, river surface water having an average turbidity among days of 1 and a fine particle diameter of from 5 to 200 μm (medium value: 50 μm) was used. The filtration was conducted using cross-flow type filtration in which raw water was fed into a hollow fiber membrane at a constant flow of 3.0 [l/min·module·25° C.] so as to be a ratio of membrane filtration flow to a water circulation flow of 1/1, according to an external pressure filtration operation with a constant filtration flow, i.e., a filtrate amount of 1.5 [l/min·module·25° C.].

The operation was performed by repeating a 20 minute filtration followed by back wash with filtration water at a flow of 2.5 [l/min·module·25° C.] for 20 seconds and conducting air-scrubbing with compressed air at a flow of 7 [Nl/min·module·25° C.] for one minute every hour. The turbidity of raw water was 1.0 degree. The total amount of the filtrate permeating the membrane during the filtration step was 30 liters. The amount of suspended solids accumulating was 0.025.

As the filtration operation proceeded, the filtration pressure gradually increased and reached twice the initial filtration pressure in the fifth month.

After the operation, the module was taken out from the device to check leakage. No leak was observed.

Further, the above-mentioned hollow fiber membrane module was washed with a sodium hypochlorite solution, a sodium hydroxide solution, an oxalic acid solution and a nitric acid solution until the recoverability was saturated. When the pure water flux amount was measured, it was 96% of the initial value.

Subsequently, when the hollow fiber membrane module was dismantled to observe the membrane outer surface of the hollow fiber membrane with a scanning electronic microscope (magnification: 5,000 fold), the damage of the membrane surface was negligible.

EXAMPLE 16 (PURIFYING METHOD/THIS INVENTION)

Using the hollow fiber membrane module obtained in Example 6, a purifying operation was conducted. As raw water, river surface water having a turbidity of 0.1 to 5 degrees (average: 2.4 degrees), a fine particle diameter in water of from 0.9 to 30 μm (medium value: 9 μm) and a temperature of 12° C. was used.

The filtration was conducted using cross-flow type filtration in which raw water was fed into a hollow fiber membrane at a constant flow of 2.6 [m³/hr·module·25° C.] so as to a ratio of a membrane filtration flow to a water circulation flow of 1/1, with a constant filtration flow, i.e., a filtrate amount of 1.3 [m³/hr·module·25° C.].

The operation was performed by repeating a 20 minute filtration followed by back wash with filtrate for 20 seconds and conducting back wash with filtrate at a flow of 1.3 [m³/hr·module·25° C.] and air-scrubbing with compressed air at a flow of 2 [Nm³/hr·module·25° C.] simultaneously for 2 minutes every hour. The turbidity of raw water was 2.4 degrees. The total amount of the filtrate permeating the membrane during the filtration step was 0.43 m³. The amount of suspended solids accumulating was 0.15.

After 12 month operation under the above-mentioned conditions, the trans-membrane pressure became 1.3 times the initial value. After the operation, the module was taken out from the device to check leakage. No leak was observed. Subsequently, the hollow fiber membrane module after the operation was dismantled and a single hollow fiber was subjected to chemical wash with a mixed solution of a sodium hypochlorite solution and a sodium hydroxide solution and a mixed solution of an oxalic acid solution and a nitric acid solution. When a pure water flux amount was measured, it corresponded to 95% of that of unused membrane. When the membrane outer surface of the hollow fiber membrane was observed with a scanning electronic microscope (magnification: 5,000 fold), the damage of the membrane outer surface was negligible.

EXAMPLE 17 (PURIFYING METHOD/THIS INVENTION)

Using the hollow fiber membrane module obtained in Example 6, an operation was conducted in substantially the same manner as Example 16 except that the operation was performed by conducting a membrane filtration for 60 minutes and conducting back wash with filtrate and air-scrubbing with compressed air simultaneously for 2 minutes. The turbidity of raw water was 2.4 degrees. The total amount of filtrate permeating the membrane during the filtration step was 1.3 m³. The amount of suspended solids accumulating was 0.44.

After 6 month operation under the above-mentioned conditions, the trans-membrane pressure became 1.4 times the initial value. After the operation, the module was taken out from the device to check leakage. No leak was observed. Subsequently, the hollow fiber membrane module after the operation was dismantled, and a single hollow fiber was subjected to chemical wash with a mixed solution of a sodium hypochlorite solution and a sodium hydroxide solution and a mixed solution of an oxalic acid solution and a nitric acid solution. When a pure water flux amount was measured, it corresponded to 95% of that of unused membrane. When the membrane outer surface of the hollow fiber membrane was observed with a scanning electronic microscope (magnification: 5,000 fold), the damage of the membrane surface was negligible.

EXAMPLE 18 (PURIFYING METHOD/THIS INVENTION)

Using the membrane module obtained in Example 7, an operation was conducted. As raw water, river surface water having turbidity of from 1 to 3 degrees (average: 1.8 degrees) and a fine particle diameter of from 2 to 50 μm (medium value: 22 μm) was used. As shown in FIG. 2, raw water (11) was fed under pressure into a hollow fiber membrane module (14) through a circulation tank (12) by using a raw water feed pump (13). The resultant filtrate was stored in a filtrate tank (15). The raw water fed into the hollow fiber membrane module (14) under pressure was mixed with an ozone gas generated by an ozone generator (18) to obtain a concentration of ozone water of 0.3 mg/l at the filtrate side. At the time of back wash, the filtrate in the filtrate tank (15) was fed into the hollow fiber membrane module (14) by using a back wash pump (16).

The filtration was conducted according to a dead-end type one under constant pressure, i.e., a trans-membrane pressure of 30 kPa, in which the raw water (11) was supplied to the hollow fiber membrane module (14) and concentrated water was not discharged except for discharge of ozone-containing air. At the time of back wash, a back wash pressure was 50 kPa.

After the above filtration test was continuously conducted for 10 days, the filtrate amount recovered was 70% of the initial value.

Subsequently, when the hollow fiber membrane module was taken out from the filtration operation device and weighed, its weight had increased to 115% of the initial weight.

Again, this module was installed in the operation device shown in FIG. 2 to conduct air-scrubbing (supplying water amount: 3 m³/Hr, supplying air amount: 5 Nm³/Hr, air-scrubbing period: 5 min) with a valve on the filtrate side of the hollow fiber membrane module shut while feeding raw water.

After the air-scrubbing, the hollow fiber membrane module was again weighed. The weight was 103% of the initial weight.

This means that suspended solids were discharged by air-scrubbing in an amount corresponding to 12% of the weight of the hollow fiber membrane module.

Further, the above hollow fiber membrane module was subjected to leakage check. No leak was observed.

The above hollow fiber membrane module was dismantled to observe the state of bonded and fixed portions. It was confirmed that both the external and central portions of the hollow fiber membrane bundle were sufficiently filled up with the bonding agent.

EXAMPLE 19 (PURIFYING METHOD/THIS INVENTION)

Using the hollow fiber membrane module obtained in Example 5, the operation was conducted. As raw water, river surface water having turbidity of from 3 to 340 degrees (average: 120 degrees) and a fine particle diameter of from 2 to 130 μm (medium value: 43 μm) was used.

The filtration was conducted according to a cross flow filtration type operation, in which raw water was fed into a hollow fiber membrane module at a constant flow of 8.0 [l/min·module·25° C.] so as to be a ratio of an amount of water filtered through the membrane to that of water circulating of 1/1, with a constant filtration flow, i.e., a filtrate amount of 4.0 [l/min·module·25° C.].

The operation was performed by repeating a 10 minute filtration followed by conducting back wash with filtrate at a flow of 6.0 [l/min·module·25° C.] and air-scrubbing with compressed air at a flow of 8 [Nm³/hr·module·25° C.] simultaneously for one minute. The turbidity of raw water was 120 degrees. The total filtrate permeating membrane during the filtration step was 40 liters. The amount of suspended solids accumulating was 4.1.

After the operation was performed for 2 months under the above-mentioned conditions, raw water having high turbidity of 340 degrees was fed for 2 days. Therefore, just for these two days and the following day, i.e., for three days in total, the operation conditions were changed to the manner wherein back wash and air-scrubbing were simultaneously conducted after 5 minute filtration. At this time, the amount of suspended solids accumulating was 5.8 since physical wash was conducted every 5 minutes; while, the amount of suspended solids accumulating was 11.6 in the operation of 10 minute filtration followed by one minute physical wash.

After operating for a total of 3 months, the trans-membrane pressure reached 1.3 times the initial value. Then, the module was taken out from the device to check leakage. No leak was observed. Subsequently, the hollow fiber membrane module after the operation was dismantled and a single hollow fiber was subjected to chemical wash with a mixed solution of a sodium hypochlorite solution and a sodium hydroxide solution and a mixed solution of an oxalic acid solution and a nitric acid solution. When a pure water flux amount was measured, it corresponded to 95% of that of unused membrane. When the membrane outer surface of the hollow fiber membrane was observed with a scanning electronic microscope (magnification: 5,000 fold), the damage of the membrane outer surface was negligible.

EXAMPLE 20 (PURIFYING METHOD/THIS INVENTION)

Using the hollow fiber membrane module obtained in Example 5, a filtration operation was conducted. As raw water, river surface water having turbidity of from 0.1 to 3 degrees (average: 1.2 degrees), a fine particle diameter of from 0.5 to 30 $\mu$m (medium value: 7 $\mu$m) and a temperature of 18° C. was used.

The filtration was conducted using a cross flow filtration type operation, in which raw water was fed into a hollow fiber membrane module at a constant flow of 3.0 [m$^3$/hr·module·25° C.] so as to be a ratio of an amount of water filtered through the membrane to that of water circulating of 1/1, with a constant filtration flow, i.e., a filtrate amount of 1.5 [m$^3$/hr·module·25° C.].

The operation was performed by repeating a filtration cycle in which back wash with filtrate at a flow of 1.5 [m$^3$/hr·module·25° C.] and air-scrubbing with compressed air at a flow of 2 [Nm$^3$/hr·module·25° C.] were simultaneously conducted for two minutes after 30 minute filtration. The turbidity of raw water was 1.2 degrees. The total filtrate permeating membrane during the filtration step was 0.75 m$^3$. The amount of suspended solids accumulating was 0.13.

After the operation was performed for 10 months under the above-mentioned operation conditions, the trans-membrane pressure was 1.2 times the initial value. Then, the module was taken out from the apparatus to check leakage. No leak was observed. Subsequently, the hollow fiber membrane module after the operation was dismantled and a single hollow fiber was subjected to chemical wash with a mixed solution of a sodium hypochlorite solution and a sodium hydroxide solution and a mixed solution of an oxalic acid solution and a nitric acid solution. When a pure water flux amount was measured, it corresponded to 96% of that of unused membrane. When the membrane outer surface of the hollow fiber membrane was observed with a scanning electronic microscope (magnification: 5,000 fold), the damage of the membrane outer surface was negligible.

EXAMPLE 21 (PURIFYING METHOD/THIS INVENTION)

Using the hollow fiber membrane module obtained in Example 5, a filtration operation was conducted. As raw water, river surface water having turbidity of from 0.1 to 3 degrees (average: 1.2 degrees), a fine particle diameter of from 0.5 to 30 $\mu$m (medium value: 7 $\mu$m) and a temperature of 18° C. was used.

The filtration was conducted using a cross flow filtration type operation, in which raw water was fed into a hollow fiber membrane module at a constant flow of 3.0 [m$^3$/hr·module·25° C.] to obtain a ratio of an amount of water filtered through the membrane to that of water circulating of 1/1, with a constant filtration flow, i.e., a filtrate amount of 1.5 [m$^3$/hr·module·25° C.].

The operation was performed by repeating a filtration cycle in which after 30 minute filtration, back wash with filtrate at a flow of 1.5[m$^3$/hr·module·25° C.] and air-scrubbing with compressed air at a flow of 2 [Nm$^3$/hr·module·25° C.] were simultaneously conducted for 1 minute and a flushing with raw water was conducted at a flow of 2.5 [m$^3$/hr·module·25° C.] for one minute. The turbidity of raw water was 1.2 degrees. The total filtrate permeating membrane during the filtration step was 0.75 m$^3$. The amount of suspended solids accumulating was 0.13.

After the operation was performed for 5 months under the above-mentioned operation conditions, the trans-membrane pressure was 1.2 times the initial value. Then, the module was taken out from the device to check leakage. No leak was observed. Subsequently, the hollow fiber membrane module after the operation was dismantled and a single hollow fiber was subjected to chemical wash with a mixed solution of a sodium hypochlorite solution and a sodium hydroxide solution and a mixed solution of an oxalic acid solution and a nitric acid solution. When a pure water flux amount was measured, it corresponded to 95% of that of unused membrane. When the membrane outer surface of the hollow fiber membrane was observed with a scanning electronic microscope (magnification: 5,000 fold), the damage of the membrane surface was negligible.

EXAMPLE 22 (PURIFYING METHOD/COMPARISON)

An operation was performed in parallel with Example 14 under substantially the same conditions as described in Example 14 except that the hollow fiber membrane module obtained in Example 8 was used. After the operation was conducted for 20 days, the trans-membrane pressure was 3.5 times the initial value.

After the filtration test, the leakage was checked. No leak was observed.

Further, after the above-mentioned membrane module was washed with a sodium hydroxide aqueous solution, a sodium hypochlorite aqueous solution, an oxalic acid aqueous solution and a nitric acid aqueous solution until the recoverability was saturated, the flux amount of pure water was measured. It was 66% of the initial value.

Subsequently, the hollow fiber membrane module was dismantled and the membrane outer surface of the hollow fiber membrane was observed with a scanning electronic microscope (magnification: 5,000 fold). It was observed that about 75% of the membrane surface was rough and a part of the open pores on the membrane surface was covered. This was supposed to be a factor in causing a decrease of the water flux amount.

EXAMPLE 23 (PURIFYING METHOD/COMPARISON)

An operation was performed in parallel with Example 15 under substantially the same conditions as described in Example 15 except that the hollow fiber membrane module obtained in Example 8 was used.

The filtration pressure gradually increased as the filtration operation proceeded. The trans-membrane pressure reached 3 times the initial value in the second month and the fourth month of the filtration operation. Therefore, the module was subjected to chemical wash with a sodium hydroxide aqueous solution, a sodium hypochlorite aqueous solution, an oxalic acid aqueous solution and a nitric acid aqueous solution.

When the total operation term was 5 months, the hollow fiber membrane module was taken out from the device to check the leakage. No leak was observed.

Further, after the above-mentioned membrane module was washed with a sodium hydroxide aqueous solution, a sodium hypochlorite aqueous solution, an oxalic acid aqueous solution and a nitric acid aqueous solution until the recoverability was saturated, the flux amount of pure water was measured. It was 72% of the initial value.

Subsequently, the hollow fiber membrane module was dismantled and the membrane outer surface of the hollow fiber membrane was observed with a scanning electronic microscope (magnification: 5,000 fold). It was observed that about 70% of the membrane surface was rough and a part of the open pores on the membrane surface was covered. This was supposed to be a factor in causing a decrease of the water flux amount.

EXAMPLE 24 (PURIFYING METHOD/COMPARISON)

An operation was performed in parallel with Example 16 under substantially the same conditions as described in Example 16 except that the hollow fiber membrane module obtained in Example 9 was used.

After operating for 6 months, the trans-membrane pressure became 2.0 times the initial value. Judging that it would be impossible to continue the filtration operation further, the hollow fiber membrane module was dismantled. A single fiber of the hollow fiber membrane module was dismantled and subjected to chemical wash with a mixed solution of a sodium hypochlorite aqueous solution and a sodium hydroxide aqueous solution, and with a mixed solution of an oxalic acid aqueous solution and a nitric acid aqueous solution, and the flux amount of pure water of the single fiber was measured. It corresponded to 80% of that of an unused membrane. The outer surface of the membrane was observed with a scanning electronic microscope (magnification: 5,000 fold). It was observed that approximately 70% of the membrane surface was rough and a part of open pores on the membrane surface was covered. This was supposed to be a factor in causing a decrease of the water flux amount.

EXAMPLE 25 (PURIFYING METHOD/COMPARISON)

An operation was performed in parallel with Example 17 under substantially the same conditions as described in Example 17 except that the hollow fiber membrane module obtained in Example 9 was used.

After operating for 4 months, the trans-membrane pressure reached 2.0 times the initial value. Judging that it would be impossible to conduct the filtration operation further, the hollow fiber membrane module was dismantled. After a single fiber of the hollow fiber membrane module dismantled was subjected to chemical wash with a mixed solution of a sodium hypochlorite aqueous solution and a sodium hydroxide aqueous solution, and with a mixed solution of an oxalic acid aqueous solution and a nitric acid aqueous solution, the flux amount of pure water of the single fiber was measured. It corresponded to 82% of that of an unused membrane. The outer surface of membrane was observed with a scanning electronic microscope (magnification: 5,000 fold). It was observed that approximately 70% of the membrane surface was rough and a part of open pores on the membrane surface was covered. This was supposed to be a factor in causing a decrease of the water flux amount.

EXAMPLE 26 (PURIFYING METHOD/COMPARISON)

A filtration operation was conducted under substantially the same conditions as described in Example 18 except that the hollow fiber membrane module obtained in Example 10 was used.

After the above filtration test was continuously conducted for 10 days, the filtrate amount recovered was 60% of the initial value.

Subsequently, when the hollow fiber membrane module was taken out from the filtration operation apparatus and weighed, its weight was increased to 120% of the initial weight.

Again, this module was installed in the filtration operation device to conduct air-scrubbing (supplying water amount: 3 $m^3$/Hr, supplying air amount: 5 $Nm^3$/Hr, air-scrubbing period: 5 min) with a valve on the filtrate side of the hollow fiber membrane module shut while feeding raw water.

After the air-scrubbing, the hollow fiber membrane module was again weighed. The weight was 115% of the initial weight.

This means that suspended solids were discharged by air-scrubbing in an amount corresponding to 5% of the weight of the hollow fiber membrane module.

Further, the above hollow fiber membrane module was subjected to leakage check. No leak was observed.

The above hollow fiber membrane module was dismantled to observe the state of bonded and fixed portions. It was confirmed that a part of the central portion of the hollow fiber membrane bundle was not sufficiently filled up with the bonding agent.

EXAMPLE 27 (PURIFYING METHOD/COMPARISON)

The filtration operation was performed in parallel with Example 19 under substantially the same conditions as described in Example 19 except that the hollow fiber membrane module obtained in Example 8 was used.

When the filtration operation was performed for 2 months under the above-mentioned conditions, raw water having high turbidity of 340 degrees was fed for 2 days. Therefore, just for these two days and the following day, i.e., for three days in total, the operation conditions were changed to the manner wherein back wash and air-scrubbing were simultaneously conducted after 5 minute filtration. At this time, the amount of suspended solids accumulating was 5.8 since physical wash was conducted every 5 minutes; while, the amount of suspended solids accumulating was 11.6 in the operation of 10 minute filtration followed by one minute physical wash.

After operating for a total of 3 months, the trans-membrane pressure reached 2.5 times the initial value. Then, the module was taken out from the device to check leakage. No leak was observed. Subsequently, the hollow fiber membrane module after the operation was dismantled and a single hollow fiber was subjected to chemical wash with a mixed solution of a sodium hypochlorite solution and a sodium hydroxide solution, and a mixed solution of an oxalic acid solution and a nitric acid solution. When a pure water flux amount was measured, it corresponded to 74% of that of an unused membrane.

When the membrane outer surface of the hollow fiber membrane was observed with a scanning electronic microscope (magnification: 5,000 fold), approximately 70% of the membrane surface was rough and a part of open pores on the membrane surface was covered. This was supposed to be a factor in causing a decrease of the water flux amount.

EXAMPLE 28 (PURIFYING METHOD/THIS INVENTION)

An operation was performed under substantially the same conditions as described in Examples 14 and 22 except that the hollow fiber membrane module obtained in Example 11 was used. After operating for 20 days, the trans-membrane pressure reached 2.9 times the initial value. After the filtration test, leakage was checked. No leak was observed.

Further, the above-mentioned membrane module was washed with a sodium hydroxide aqueous solution, a sodium hypochlorite aqueous solution, an oxalic acid aqueous solution and a nitric acid aqueous solution until the recoverability was saturated. When the flux amount of pure water was measured, it was 87% of the initial value.

Then, the outer surface of membrane was observed with a scanning electronic microscope (magnification: 5,000 fold). It was observed that approximately 20% of the membrane surface was rough and a part of open pores on the membrane surface was slightly covered. This was supposed to be a factor in causing a decrease of the water flux amount.

EXAMPLE 29 (PURIFYING METHOD/THIS INVENTION)

An operation was performed in parallel with Examples 15 and 23 under substantially the same conditions as described in Examples and 23 except that the hollow fiber membrane module obtained in Example 11 was used.

The filtration pressure gradually increased as the filtration operation proceeded. The trans-membrane pressure reached 3 times the initial value in the third month of the filtration operation. Therefore, the module was subjected to chemical wash with a sodium hydroxide aqueous solution, a sodium hypochlorite aqueous solution, an oxalic acid aqueous solution and a nitric acid aqueous solution.

When the total operation term was 5 months, the hollow fiber membrane module was taken out from the device to check the leakage. No leak was observed.

Further, the above-mentioned membrane module was washed with sodium hydroxide aqueous solution, sodium hypochlorite aqueous solution, oxalic acid aqueous solution and nitric acid aqueous solution until the recoverability was saturated. When the flux amount of pure water was measured, it was 79% of the initial value.

Subsequently, the hollow fiber membrane module was dismantled and the membrane outer surface of the hollow fiber membrane was observed with a scanning electronic microscope (magnification: 5,000 fold). It was observed that about 20% of the membrane surface was rough and a part of the open pores on the membrane surface was covered. This was supposed to be a factor in causing a decrease of the water flux amount.

EXAMPLE 30 (PURIFYING METHOD/THIS INVENTION)

An operation was performed under substantially the same conditions as described in Examples 14 and 22 except that the hollow fiber membrane module obtained in Example 12 was used and river surface water having a turbidity of 0.1 to 5 degrees (average: 2.2 degrees), a fine particle diameter of from 0.9 to 30 $\mu$m (medium value: 9 $\mu$m) and a temperature of 12° C. was employed as raw water. The turbidity of raw water was 2.2 degrees. The total amount of filtrate permeating the membrane during the filtration step was 0.43 m$^3$. The amount of suspended solids accumulating was 0.13.

After operating for 8 months, the trans-membrane pressure reached 2.0 times the initial value. Judging that it would be impossible to conduct the filtration operation further, the hollow fiber membrane module was dismantled. A single fiber of the dismantled hollow fiber membrane module was subjected to chemical wash with a mixed solution of a sodium hypochlorite aqueous solution and a sodium hydroxide aqueous solution, and with a mixed solution of an oxalic acid aqueous solution and a nitric acid aqueous solution. When the flux amount of pure water of the single fiber was measured, it corresponded to 83% of that of an unused membrane. The outer surface of membrane was observed with a scanning electronic microscope (magnification: 5,000 fold). It was observed that approximately 20% of the membrane surface was rough and a part of open pores on the membrane surface was slightly covered. This was supposed to be a factor in causing a decrease of the water flux amount.

EXAMPLE 31 (PURIFYING METHOD/THIS INVENTION)

An operation was conducted in parallel with Examples 19 and 27 under substantially the same conditions as described in Examples 19 and 27 except that the hollow fiber membrane module obtained in Example 11 was used.

When the filtration operation was performed for 2 months under the above-mentioned conditions, raw water having high turbidity of 340 degrees was fed for 2 days. Therefore, just for these two days and the following day, i.e., for three days in total, the operation conditions were changed to the manner wherein back wash and air-scrubbing were simultaneously conducted after 5 minute filtration. At this time, the amount of suspended solids accumulating was 5.8 since physical wash was conducted every 5 minutes; while, the amount of suspended solids accumulating was 11.6 in the operation of 10 minute filtration followed by one minute physical wash.

After operating for a total of 3 months, the trans-membrane pressure reached 2.0 times the initial value. Then, the module was taken out from the apparatus to check leakage. No leak was observed. Subsequently, the hollow fiber membrane module was dismantled and a single hollow fiber was subjected to chemical wash with a mixed solution of a sodium hypochlorite solution and a sodium hydroxide solution and a mixed solution of an oxalic acid solution and a nitric acid solution. When a pure water flux amount was measured, it corresponded to 78% of that of an unused membrane.

When the membrane outer surface of the hollow fiber membrane was observed with a scanning electronic microscope (magnification: 5,000 fold), approximately 20% of the membrane surface was rough and a part of open pores on the membrane surface was slightly covered. This was supposed to be a factor in causing a decrease of the water flux amount.

EXAMPLE 32 (PURIFYING METHOD/THIS INVENTION)

A filtration operation was performed at the same time of Example 28 under substantially the same conditions as described in Example 28 except that the hollow fiber membrane module obtained in Example 13 was used. After operating for 20 days, the trans-membrane pressure reached 3.3 times the initial value. After the filtration operation, leakage was checked. No leak was observed.

Further, the above-mentioned membrane module was washed with a sodium hydroxide aqueous solution, a sodium hypochlorite aqueous solution, an oxalic acid aqueous solution and a nitric acid aqueous solution until the recoverability was saturated. When the flux amount of pure water was measured, it was 70% of the initial value.

Then, the outer surface of membrane was observed with a scanning electronic microscope (magnification: 5,000 fold). It was observed that approximately 50% of the membrane surface was rough and a part of open pores on the membrane surface was slightly covered. This was supposed to be a factor in causing a decrease of water flux amount.

The results of Examples 1 to 32 are shown in Tables 2 to 9. As seen form Tables 2 to 9, it is apparent that in the purifying methods employing a hollow fiber membrane having an outer diameter of from 0.5 to 3.1 mm, one employing a wavy hollow fiber membrane, which is covered by the scope of the present invention, provides a more stable filtration than one employing a non-wavy hollow fiber membrane without waves. Further, it is seen that more preferable results can be obtained when the bulkiness is within the preferred range (1.45 to 2.00) or when waves having different wavelength and wave height exist together.

TABLE 1

| nNumber | Example 1 | | | Example 2 | | | Example 3 | | | Example 4 | | |
| --- | --- | --- | --- | --- | --- | --- | --- | --- | --- | --- | --- | --- |
| | Major Axis [μm] | Minor Axis [μm] | Flatness | Major Axis [μm] | Minor Axis [μm] | Flatness | Major Axis [μm] | Minor Axis [μm] | Flatness | Major Axis [μm] | Minor Axis [μm] | Flatness |
| 1 | 699 | 677 | 0.969 | 713 | 685 | 0.961 | 777 | 633 | 0.815 | 715 | 679 | 0.950 |
| 2 | 714 | 693 | 0.971 | 715 | 698 | 0.976 | 792 | 607 | 0.766 | 709 | 681 | 0.961 |
| 3 | 707 | 686 | 0.970 | 703 | 701 | 0.997 | 768 | 641 | 0.835 | 707 | 676 | 0.956 |
| 4 | 727 | 688 | 0.946 | 720 | 682 | 0.947 | 799 | 585 | 0.732 | 728 | 682 | 0.937 |
| 5 | 709 | 698 | 0.984 | 706 | 680 | 0.963 | 755 | 649 | 0.860 | 729 | 683 | 0.937 |
| Average | 711.2 | 688.4 | 0.968 | 711.4 | 689.2 | 0.969 | 778.2 | 623.0 | 0.801 | 717.6 | 680.2 | 0.948 |

TABLE 2

| | Inner Diameter (mm) | Membrane Thickness (mm) | Outer Diameter (mm) | Flatness | Fiber Shape | Bulkiness |
| --- | --- | --- | --- | --- | --- | --- |
| Example 1 | 0.7 | 0.28 | 1.25 | 0.968 | Ununiform Wave | 1.66 |
| Example 2 | 0.7 | 0.28 | 1.25 | 0.969 | Straight | 1.43 |
| Example 3 | 0.7 | 0.28 | 1.25 | 0.801 | Uniform Wave | 1.51 |
| Example 4 | 0.7 | 0.28 | 1.25 | 0.948 | Uniform Wave | 1.44 |

TABLE 3

| | Membrane | Packing Number | Packing Ratio |
| --- | --- | --- | --- |
| Example 5 | Example 1 | 300 | 36% |
| Example 6 | Example 1 | 1800 | 41% |
| Example 7 | Example 1 | 5760 | 40% |
| Example 8 | Example 2 | 300 | 36% |
| Example 9 | Example 2 | 1800 | 41% |
| Example 10 | Example 2 | 5760 | 40% |
| Example 11 | Example 3 | 300 | 36% |
| Example 12 | Example 3 | 1800 | 41% |
| Example 13 | Example 4 | 300 | 36% |

TABLE 4

| | Module | Type of Filtration | Diameter of Fine Particle [μm] | Average Diameter of Fine Particle [μm] | Average Turbidity [degree] | Accumulating Amount of Suspended Solid | Type of Physical Wash | Test Time | Ascent Ratio in Filtration Pressure | Wash Recoverability |
| --- | --- | --- | --- | --- | --- | --- | --- | --- | --- | --- |
| Ex. 14 | Ex. 5 | Constant Flow | 0.9–30 | 9 | 770 | 5.8 | RF/AS | 20 days | 1.2 fold | 98 [%] |
| Ex. 22 | Ex. 8 | Constant Flow | 0.9–30 | 9 | 770 | 5.8 | RF/AS | 20 days | 3.5 fold | 66 [%] |
| Ex. 28 | Ex. 11 | Constant Flow | 0.9–30 | 9 | 770 | 5.8 | RF/AS | 20 days | 2.9 fold | 87 [%] |
| Ex. 32 | Ex. 13 | Constant Flow | 0.9–30 | 9 | 770 | 5.8 | RF/AS | 20 days | 3.3 fold | 70 [%] |

*RF/AS: Back wash and air-scrubbing were individually performed.

TABLE 5

| | Module | Type of Filtration | Diameter of Fine Particle [μm] | Average Diameter of Fine Particle [μm] | Average Turbidity [degree] | Accumulating Amount of Suspended Solid | Type of Physical Wash | Test Time | Ascent Ratio in Filtration Pressure | Wash Recoverability |
|---|---|---|---|---|---|---|---|---|---|---|
| Ex. 15 | Ex. 5 | Constant Flow | 5–200 | 50 | 1 | 0.025 | RF/AS | 5 months | 2 fold | 96 [%] |
| Ex. 23 | Ex. 8 | Constant Flow | 5–200 | 50 | 1 | 0.025 | RF/AS | 5 months | 3 fold | 72 [%] |
| Ex. 29 | Ex. 11 | Constant Flow | 5–200 | 50 | 1 | 0.025 | RF/AS | 5 months | 3 fold | 79 [%] |

*RF/AS: Back wash and air-scrubbing were individually performed.
*Ascent ratio in Filtration Pressure:
Ex. 23: Value in 2$^{nd}$ and 4$^{th}$ month operation
Ex. 29: Value in 3$^{rd}$ month operation

TABLE 6

| | Module | Type of Filtration | Diameter of Fine Particle [μm] | Average Diameter of Fine Particle [μm] | Average Turbidity [degree] | Accumulating Amount of Suspended Solid | Type of Physical Wash | Test Time | Ascent Ratio in Filtration Pressure | Wash Recoverability |
|---|---|---|---|---|---|---|---|---|---|---|
| Ex. 16 | Ex. 6 | Constant Flow | 0.9–30 | 9 | 2.4 | 0.15 | AS-RF | 12 months | 1.3 fold | 95 [%] |
| Ex. 24 | Ex. 9 | Constant Flow | 0.9–30 | 9 | 2.4 | 0.15 | AS-RF | 6 months | 2 fold | 80 [%] |
| Ex. 30 | Ex. 12 | Constant Flow | 0.9–30 | 9 | 2.2 | 0.15 | AS-RF | 8 months | 2 fold | 81 [%] |

*AS-RF: Air-scrubbing and back wash were simultaneously performed.

TABLE 7

| | Module | Type of Filtration | Diameter of Fine Particle [μm] | Average Diameter of Fine Particle [μm] | Average Turbidity [degree] | Accumulating Amount of Suspended Solid | Type of Physical Wash | Test Time | Ascent Ratio in Filtration Pressure | Wash Recoverability |
|---|---|---|---|---|---|---|---|---|---|---|
| Ex. 17 | Ex. 6 | Constant Flow | 0.9–30 | 9 | 2.4 | 0.44 | AS-RF | 6 months | 1.4 fold | 95 [%] |
| Ex. 25 | Ex. 9 | Constant Flow | 0.9–30 | 9 | 2.4 | 0.44 | AS-RF | 3 months | 2 fold | 82 [%] |

*AS-RF: Air-scrubbing and back wash were simultaneously performed.

TABLE 8

| | Module | Type of Filtration | Diameter of Fine Particle [μm] | Average Diameter of Fine Particle [μm] | Average Turbidity [degree] | Changing Ratio in Module Weight | Type of Physical Wash | Test Time | Descent Ratio in Permeation Flux |
|---|---|---|---|---|---|---|---|---|---|
| Ex. 18 | Ex. 7 | Constant Pressure | 0.9–30 | 9 | 1.0–3 | 115% → 103% | RF | 10 days | 70 [%] |
| Ex. 26 | Ex. 10 | Constant Pressure | 0.9–30 | 9 | 1.0–3 | 120% → 115% | RF | 10 days | 60 [%] |

*RF: Only back wash was performed.
*Changing Ratio in Module Weight: Weight % of weight just after test to initial weight → Weight % of weight after air-scrubbing to initial weight

TABLE 9

|  | Module | Type of Filtration | Diameter of Fine Particle [μm] | Average Diameter of Fine Particle [μm] | Average Turbidity [degree] | Accumulating Amount of Suspended Solid | Type of Physical Wash | Test Time | Ascent Ratio in Filtration Pressure | Wash Recoverability |
|---|---|---|---|---|---|---|---|---|---|---|
| Ex. 19 | Ex. 5 | Constant Flow | 2–130 | 43 | 120 (340) | 4.1 (5.7) | AS-RF | 3 months | 1.2 fold | 95 [%] |
| Ex. 27 | Ex. 8 | Constant Flow | 2–130 | 43 | 120 (340) | 4.1 (5.7) | AS-RF | 3 months | 2.5 fold | 74 [%] |
| Ex. 31 | Ex. 11 | Constant Flow | 2–130 | 43 | 120 (340) | 4.1 (5.7) | AS-RF | 3 months | 2 fold | 78 [%] |

*AS-RF: Air-scrubbing and back wash were simultaneously performed.

What is claimed is:

1. A method for purifying an aqueous suspension comprising:
    feeding the aqueous suspension containing fine particles comprising an inorganic component from outer surfaces to inner surfaces of wavy hollow fiber membranes, which are collected with a bulkiness of from 1.45 to 2.00, and which each have an outer diameter from 0.5 to 3.1 mm and a flatness of from 0.8 to 1.0 to filter said aqueous suspension;
    the hollow fiber membranes having a bulkiness and being mounted or packed so as to substantially prevent rubbing of the membranes against each other during physical washing, and
    physically washing the hollow fiber membranes.

2. The method according to claim 1, wherein filtration time is controlled so an amount of suspended solids accumulating is from 0.005 to 10, wherein the amount of suspended solids accumulating is defined by the following formula:

amount of suspended solids accumulating=(raw water turbidity [degree])×(total amount of filtrate permeating membrane in filtration time $\{m^3\}$)/(membrane surface area $\{m^2\}$), the raw water turbidity [degree] meaning an average turbidity of raw water, which can be obtained by measuring turbidity for plural days according to JIS K 0101 9.2 and averaging the obtained value.

3. The method according to claim 1, wherein the physically washing is at least one selected from the group consisting of back wash, air-scrubbing and flushing.

4. The method according to claim 1, wherein the physically washing comprises back wash followed by air-scrubbing.

5. The method according to claim 1, wherein the physically washing comprises air-scrubbing and back wash performed simultaneously after the filtration.

6. The method according to claim 1, wherein the physically washing is comprises:
    air-scrubbing and back wash performed simultaneously after the filtration; and
    flushing.

7. The method according to claim 1, wherein the wavy hollow fiber membranes each have a flatness of from 0.9 to 1.0.

8. The method according to claim 1, wherein the wavy hollow fiber membranes each have a flatness of from 0.95 to 1.0.

9. The method according to claim 1, wherein the wavy hollow fiber membranes each have an outer diameter of from 0.7 to 2.5 mm.

10. The method according to claim 1, wherein the wavy hollow fiber membranes each have an outer diameter of from 1.0 to 2.5 mm.

11. The method according to claim 1, wherein the hollow fiber membranes each have an inner diameter of from 0.3 to 1.7 mm.

12. The method according to claim 1, wherein the wavy hollow fiber membrane each have an inner diameter of 0.3 to 1.7 mm and membrane thickness of from 0.1 to 0.7 mm.

13. The method according to claim 1, wherein the wavy hollow fiber membranes each have an inner diameter of from 0.3 to 1.7 mm and membrane thickness of from 0.1 to 0.7 mm, the membrane being oriented in the same direction and mounted with a packing ratio of from 35 to 55%.

14. A method for purifying an aqueous suspension comprising:
    feeding the aqueous suspension containing fine particles comprising an inorganic component from outer surfaces to inner surfaces of wavy hollow fiber membranes, each having an outer diameter from 0.5 to 3.1 mm, to filter said aqueous suspension wherein filtration time is controlled so an amount of suspended solids accumulating is from 0.005 to 10, the hollow fiber membranes having a bulkiness and being mounted or packed so as to substantially prevent rubbing of the membranes against each other during physical washing, wherein the amount of suspended solids accumulating is defined by the following formula:

amount of suspended solids accumulating=(raw water turbidity $\{degree\}$)×(total amount of filtrate permeating membrane in filtration time $\{m^3\}$)/(membrane surface area $\{m^2\}$), the raw water turbidity $\{degree\}$ meaning an average turbidity of raw water, which can be obtained by measuring turbidity for plural days according to JIS K 0101 9.2 and averaging the obtained value; and
    physically washing the hollow fiber membranes.

15. A method for purifying an aqueous suspension comprising:
    feeding the aqueous suspension containing fine particles comprising an inorganic component from outer surfaces to inner surfaces of wavy hollow fiber membranes, which are collected with a bulkiness of from 1.45 to 2.00 and mounted in a module case with a packing ratio of from 35 to 55%, and which each have an outer diameter from 0.5 to 3.1 mm and a flatness of from 0.8 to 1.0 to filter said aqueous suspension;
    the hollow fiber membranes having a bulkiness and being mounted or packed so as to substantially prevent rubbing of the membranes against each other during physical washing, and
    physically washing the hollow fiber membranes.

* * * * *

UNITED STATES PATENT AND TRADEMARK OFFICE
CERTIFICATE OF CORRECTION

PATENT NO.   : 6,322,703 B1
DATED        : November 27, 2001
INVENTOR(S)  : Taniguchi et al.

It is certified that error appears in the above-identified patent and that said Letters Patent is hereby corrected as shown below:

<u>Title page,</u>
Item [73], Assignee should read as follows:
-- [73]  Assignee:  Asahi Kasei Kabushiki Kaisha, Osaka (JP) --

Signed and Sealed this

Ninth Day of July, 2002

*Attest:*

JAMES E. ROGAN
*Attesting Officer*       *Director of the United States Patent and Trademark Office*